US008330834B2

(12) United States Patent
Korekado et al.

(10) Patent No.: US 8,330,834 B2
(45) Date of Patent: Dec. 11, 2012

(54) SIGNAL PROCESSING METHOD AND SOLID-STATE IMAGE SENSING DEVICE

(75) Inventors: Keisuke Korekado, Wako (JP); Tomoyuki Kamiyama, Wako (JP); Toru Takenaka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 136 days.

(21) Appl. No.: 13/073,519

(22) Filed: Mar. 28, 2011

(65) Prior Publication Data

US 2011/0242377 A1 Oct. 6, 2011

(30) Foreign Application Priority Data

Mar. 30, 2010 (JP) ................................ 2010-079319

(51) Int. Cl.
*H04N 5/217* (2011.01)
*H04N 3/14* (2006.01)
*H03M 1/00* (2006.01)
(52) U.S. Cl. ......................... 348/241; 348/294; 341/126
(58) Field of Classification Search .......... 348/294–312, 348/241, 243; 341/124, 141, 151
See application file for complete search history.

(56) References Cited

U.S. PATENT DOCUMENTS

| 5,432,830 | A | 7/1995 | Bonnot | |
|---|---|---|---|---|
| 7,460,062 | B2 * | 12/2008 | Nakamura | ..................... 342/195 |
| 7,629,914 | B2 | 12/2009 | Muramatsu | |
| 2008/0259178 | A1 | 10/2008 | Oike | |
| 2009/0102690 | A1 * | 4/2009 | Werking | ........................ 341/143 |
| 2010/0194949 | A1 * | 8/2010 | Hisamatsu | ..................... 348/302 |
| 2010/0253821 | A1 * | 10/2010 | Yamamoto | ..................... 348/294 |
| 2010/0271520 | A1 * | 10/2010 | Nakayama | ..................... 348/302 |
| 2011/0074994 | A1 * | 3/2011 | Wakabayashi et al. | ........ 348/302 |
| 2011/0221942 | A1 * | 9/2011 | Taura | ............................ 348/294 |

FOREIGN PATENT DOCUMENTS

| EP | 2290823 | 3/2011 |
|---|---|---|
| JP | 64-053686 | 3/1989 |
| JP | 6-216762 | 8/1994 |
| JP | 2008-271279 | 11/2008 |
| JP | 4289206 | 4/2009 |
| JP | 2009-296423 | 12/2009 |

* cited by examiner

*Primary Examiner* — John Villecco
*Assistant Examiner* — Selam Gebriel
(74) *Attorney, Agent, or Firm* — Squire Sanders (US) LLP

(57) ABSTRACT

A solid-state image sensing device reads repeatedly M times an analog signal having a black level, during a first A/D conversion period. A frequency divider frequency-divides by M a pulse train depending on the analog signal having a black level that is read repeatedly M times, and a counter circuit counts the pulses of the pulse train, which is frequency-divided by M. Thereafter, the solid-state image sensing device reads repeatedly N times an analog signal having a signal level, during a second A/D conversion period. The frequency divider frequency-divides by N a pulse train depending on the analog signal having a signal level that is read repeatedly N times, and the counter circuit counts the pulses of the pulse train, which is frequency-divided by N. M and N satisfy the relationship $N \leq M$.

9 Claims, 21 Drawing Sheets

SIGNAL PROCESSING METHOD AND SOLID-STATE IMAGE SENSING DEVICE

CROSS-REFERENCE TO RELATED APPLICATION

This application is based upon and claims the benefit of priority from Japanese Patent Application No. 2010-079319 filed on Mar. 30, 2010, of which the contents are incorporated herein by reference.

BACKGROUND OF THE INVENTION

1. Field of the Invention

The present invention relates to a signal processing method and a solid-state image sensing device for converting pixel voltage signals into digital signals.

2. Description of the Related Art

Analog signals read from a pixel matrix are converted into digital signals by an A/D converter. An analog signal read from a pixel has a voltage level that is represented by the sum of a pixel-resetting component (black level) and the pixel's own signal component (i.e., a signal component of the pixel itself).

Japanese Laid-Open Patent Publication No. 2009-296423 discloses an integrating A/D converter for producing a signal component from a pixel by finding the difference between a black level and a signal level. More specifically, the disclosed integrating A/D converter counts down a train of successive pulses depending on the black level, and thereafter counts up a train of successive pulses depending on the signal level, thereby producing a digital pixel signal level. When counting pulses, the disclosed integrating A/D converter counts down the train of successive pulses depending on the black level W times, and counts up the train of successive pulses depending on the signal level W times, thereby reducing noise caused by the A/D conversion process.

According to the technology disclosed in Japanese Laid-Open Patent Publication No. 2009-296423, however, since the bits of the counter are expanded, the train of pulses depending on the resetting component and the train of pulses depending on the signal level need to be repeatedly read and counted the same number of times, and thus the time required by the A/D conversion process is increased. Furthermore, depending on the number of times that pulses are repeatedly counted, the gradient of a ramp waveform is made sharper in order to minimize any increase in time required by the A/D conversion process. However, such an approach tends to result in increased quantization noise.

SUMMARY OF THE INVENTION

It is an object of the present invention to provide a signal processing method and a solid-state image sensing device, which are capable of reducing noise caused by an A/D conversion process, while also shortening the time required by the A/D conversion process.

To achieve the above object, there is provided a signal processing method for a solid-state image sensing device including a pixel for photoelectrically generating a photoelectron by light and storing the photoelectron, and an A/D converter for converting an analog signal, which is read from the pixel based on the stored photoelectron, into a digital signal, the A/D converter including a frequency divider which receives a pulse train depending on the analog signal read from the pixel and which is able to change a frequency dividing ratio into an arbitrary dividing ratio, and a counter circuit for counting the frequency-divided pulses. The signal processing method comprises a first reading step of reading repeatedly M times, with the A/D converter, a first pulse train depending on an analog signal having a black level from the pixel, during a first A/D conversion period in which the analog signal having a black level is converted into a digital signal, a first frequency-dividing step of frequency-dividing by M, with the frequency divider, frequency-dividing pulses of the first pulse train which is read repeatedly M times, a first counting step of counting, with the counter circuit, pulses of the first pulse train, which is read repeatedly M times and frequency-divided by M, a second reading step of reading repeatedly N times, with the A/D converter, a second pulse train depending on an analog signal having a signal level from the pixel, during a second A/D conversion period in which the analog signal having the signal level is converted into a digital signal, a second frequency-dividing step of frequency-dividing by N, with the frequency divider, frequency-dividing pulses of the second pulse train which is read repeatedly N times, and a second counting step of counting, with the counter circuit, pulses of the second pulse train, which is read repeatedly N times and frequency-divided by N. M and N satisfy the relationship $N \leq M$.

In the signal processing method, the counter circuit includes a plurality of flip-flops for counting up pulses of the pulse trains, the flip-flops being connected in cascade, a plurality of switch circuits connected as previous stages of the flip-flops, respectively, each for selecting a propagated signal from the previous flip-flops, or a low-level signal, or a high-level signal input thereto, and outputting the selected signal to each clock terminal of the following flip-flops, via the switch circuits, each of the switch circuits being constructed as a 2-to-1 selector, a control signal generating circuit for generating a switch circuit control signal to control each of the switch circuits to select the propagated signal, or the low-level signal, or the high-level signal, and a pulse generating circuit for generating one pulse to convert a count value, which is a 1's complement, from the flip-flops into a 2's complement. The switch circuits include a first switch circuit, which is supplied with the pulse trains frequency-divided by the frequency divider as the propagated signal, and other switch circuits, which are supplied with inverted output signals from the previous flip-flops as the propagated signals. The signal processing method further comprises a first complement converting step of controlling the switch circuits to invert the binary output signals thereof, with the control signal generating circuit, once during a period in which the first A/D conversion period switches to the second A/D conversion period, thereby outputting the low-level signal and the high-level signal, and converting the count value into the 1's complement, a second complement converting step of inputting the one pulse to the first switch circuit, with the pulse generating circuit, after the first A/D conversion period and before the second A/D conversion period, thereby converting the count value into the 2's complement. The first counting step comprises a step of controlling, with the control signal generating circuit, the switch circuits to output the propagated signal, for thereby the flip-flops counting up the pulses of the first pulse train, which is frequency-divided by M in the first frequency-dividing step, and the second counting step comprises a step of controlling, with the control signal generating circuit, the switch circuits to output the propagated signal after the first A/D conversion period switches to the second A/D conversion period, for thereby the flip-flops counting up the pulses of the second pulse train, which is frequency-divided by N in the second frequency-dividing step.

In the signal processing method, the flip-flops include a flip-flop of the most significant bit whose output signal functions as a sign bit.

In the signal processing method, each of the switch circuits includes a first transfer gate and a second transfer gate, the switch circuit control signal includes a first control signal, which is input to the first transfer gate, for converting the count value into the 1's complement, and a second control signal for turning on and off the first transfer gate or the second transfer gate, and the propagated signal is input to the second transfer gate.

In the signal processing method, the pixel includes a resetting section for discharging the photoelectron stored by the pixel in order to reset the pixel, and the analog signal having a black level comprises an analog signal from the pixel that is reset by the resetting section, and the analog signal having a signal level comprises an analog signal photoelectrically converted from light by the pixel.

To achieve the above object, there is also provided in accordance with the present invention a solid-state image sensing device comprising a pixel for photoelectrically generating a photoelectron by light and storing the photoelectron, and an A/D converter for reading from the pixel repeatedly M times a first pulse train depending on an analog signal having a black level, during a first A/D conversion period, for reading from the pixel repeatedly N times a second pulse train depending on an analog signal having a signal level, during a second A/D conversion period after the first A/D conversion period, and for counting pulses of the pulse trains thereby to convert the analog signals into a digital signal. The A/D converter includes a frequency divider which receives a pulse train depending on the analog signals read from the pixel and which is able to change a frequency dividing ratio into an arbitrary dividing ratio, and a counter circuit for counting the frequency-divided pulses. The frequency divider frequency-divides by M the first pulse train which is read repeatedly M times, and frequency-divides by N the second pulse train which is read repeatedly N times. The counter circuit counts pulses of the first pulse train, which is read repeatedly M times and frequency-divided by M, and counts pulses of the second pulse train, which is read repeatedly N times and frequency-divided by N. M and N satisfy the relationship N≦M.

In the solid-state image sensing device, the counter circuit comprises a plurality of flip-flops for counting up pulses of the pulse trains, the flip-flops being connected in cascade, a plurality of switch circuits connected as previous stages of the flip-flops, respectively, each for selecting a propagated signal from the previous flip-flops, or a low-level signal, or a high-level signal input thereto, and outputting the selected signal to each clock terminal of the following flip-flops, via the switch circuits, each of the switch circuits being constructed as a 2-to-1 selector, a control signal generating circuit for generating a switch circuit control signal to control each of the switch circuits to select the propagated signal, or the low-level signal, or the high-level signal, and a pulse generating circuit for generating one pulse to convert a count value, which is a 1's complement, from the flip-flops into a 2's complement when the first A/D conversion period switches to the second A/D conversion period. The switch circuits include a first switch circuit which is supplied with the pulse trains frequency-divided by the frequency divider as the propagated signal, and other switch circuits which are supplied with inverted output signals from the previous flip-flops as the propagated signals. The control signal generating circuit controls the switch circuits to output the propagated signal, for the flip-flops counting up the pulses of the first pulse train, which is read repeatedly M times and frequency-divided by M by the frequency divider, controls the switch circuits to output the propagated signal during the second A/D conversion period for the flip-flops counting up the pulses of the second pulse train, which is read repeatedly N times and frequency-divided by N by the frequency divider, and controls the switch circuits to invert the binary output signals thereof once during a period in which the first A/D conversion period switches to the second A/D conversion period, thereby outputting the low-level signal and the high-level signal, and converting the count value into the 1's complement. The pulse generating circuit inputs the one pulse to the first switch circuit after the first A/D conversion period and before the second A/D conversion period, thereby converting the count value into the 2's complement.

In the solid-state image sensing device, the flip-flops include a flip-flop of the most significant bit whose output signal functions as a sign bit.

In the solid-state image sensing device, the pixel includes a resetting section for discharging the photoelectron stored by the pixel in order to reset the pixel, and the analog signal having a black level comprises an analog signal from the pixel that is reset by the resetting section, and the analog signal having a signal level comprises an analog signal photoelectrically converted from light by the pixel.

According to the present invention, a first pulse train depending on an analog signal having a black level is read repeatedly M times, the read first pulse train is frequency-divided by M, and pulses of the frequency-divided first pulse train are counted. A second pulse train depending on an analog signal having a signal level is read repeatedly N times, the read second pulse train is frequency-divided by N, and pulses of the frequency-divided second pulse train are counted. In this manner, the number of A/D conversion cycles (which equates with the number of sampling cycles) of the analog signal having a black level, which requires a shorter period of time for one A/D conversion cycle than the analog signal having a signal level, is increased, thereby reducing noise caused by the A/D conversion process, and also reducing the time required to perform the A/D conversion process. M and N satisfy the relationship N≦M.

After the pulses of the first pulse train are counted, the count value is converted into a 2's complement, and then the pulses of the second pulse train are counted. Consequently, a counter circuit, which merely functions to count up a pulse train, may perform a subtraction process. In addition, a switch circuit constructed as a 2-to-1 selector functions as a 3-to-1 selector. Therefore, the counter circuit and a sequencer for controlling the counter circuit occupy a reduced installation area.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
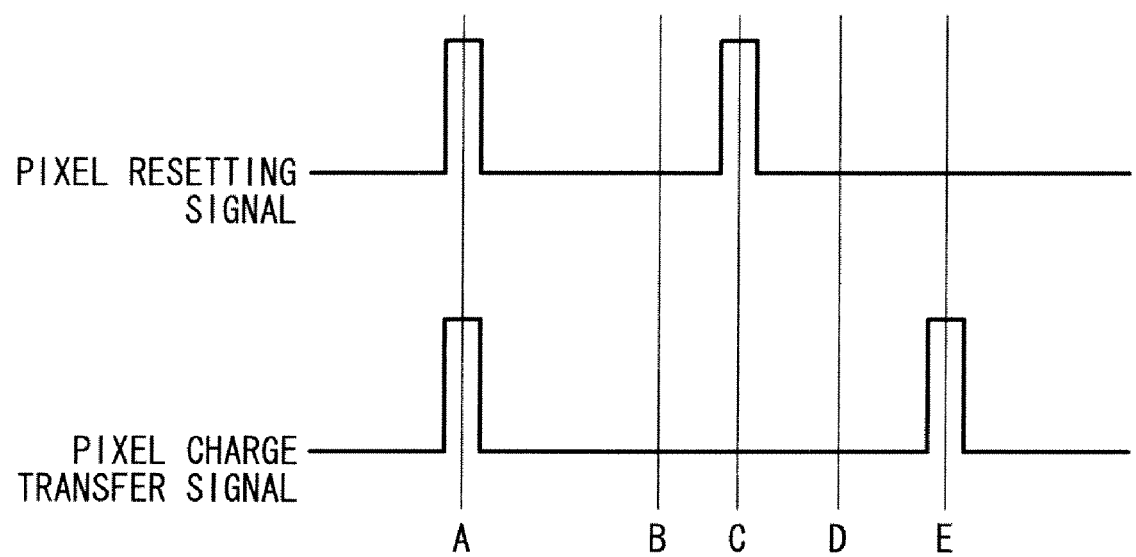
FIG. 1 is a timing chart of signals that are sent to a switching element of a pixel.

Like or corresponding reference characters denote like or corresponding parts throughout the views.

A signal processing method according to a preferred embodiment of the present invention and a solid-state image sensing device for carrying out the signal processing method will be described in detail below with reference to the accompanying drawings.

First, a pixel will briefly be described below. FIG. 1 is a timing chart of signals that are sent to a switching element of a pixel. FIGS. 2 through 6 are circuit status diagrams and potential diagrams of a pixel at timings A, B, C, D and E shown in FIG. 1.

As shown in FIGS. 2 through 6, a pixel 10 comprises a photodetector 12, a first switching element SW1, an FD (Floating Diffusion) 14, a second switching element SW2, a photoelectron discharger 16, and a pixel amplifier 18.

The photodetector 12, which generates photoelectrons by light, is connected to the FD (photoelectron holder) 14 by the first switching element SW1. The first switching element SW1 comprises an n-channel MOS transistor, for example. The first switching element SW1 can selectively be turned on and off by a pixel charge transfer signal supplied thereto. When the first switching element SW1 is turned on, a photoelectron stored in the photodetector 12 is transferred to the FD 14.

The FD 14 is connected to the photoelectron discharger 16 via the second switching element SW2. The photoelectron discharger 16 is supplied with a positive power supply voltage VDD from a power supply, not shown. The second switching element SW2 comprises an n-channel MOS transistor, for example. The second switching element SW2 can selectively be turned on and off by a pixel-resetting signal supplied thereto. When the second switching element SW2 is turned on, a photoelectron (negative electric charge), which is present in the FD 14, is discharged through the photoelectron discharger 16.

When the first switching element SW1 and the second switching element SW2 are turned on, photoelectrons, which are present in the photodetector 12 and the FD 14, are discharged (drained), thereby resetting the pixel 10. The first switching element SW1, the second switching element SW2, and the photoelectron discharger 16 function jointly as a resetting section.

The pixel amplifier 18, which amplifies the voltage of the FD 14, is connected to a vertical signal line 20. A signal representative of the voltage, which is amplified by the pixel amplifier 18 (voltage signal), is read from the vertical signal line 20.

Figure 2:
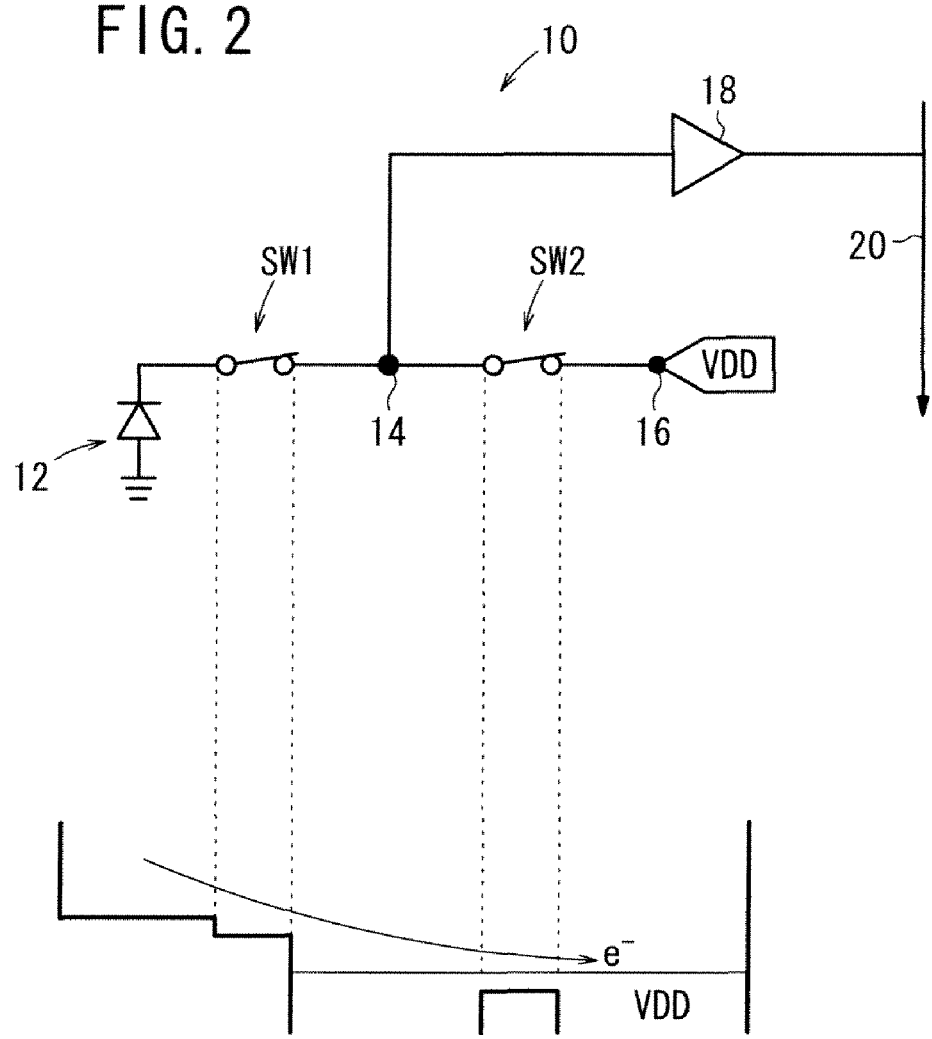
FIG. 2 is a circuit status diagram and a potential diagram of a pixel at a pixel-resetting timing A shown in FIG. 1.

FIG. 2 is a circuit status diagram and a potential diagram of the pixel 10 at a pixel-resetting timing A shown in FIG. 1. At the pixel-resetting timing A, an image resetting signal, which is of a high level (1), is supplied to the second switching element SW2, and a pixel charge transfer signal, which is of a high level (1), is supplied to the first switching element SW1, thereby turning on the first switching element SW1 and the second switching element SW2. As can be seen from the potential diagram illustrated below the circuit status diagram in FIG. 2, a photoelectron stored in the photodetector 12 and a photoelectron that resides in the FD 14 are discharged from the photoelectron discharger 16, thereby resetting the pixel 10.

Figure 3:
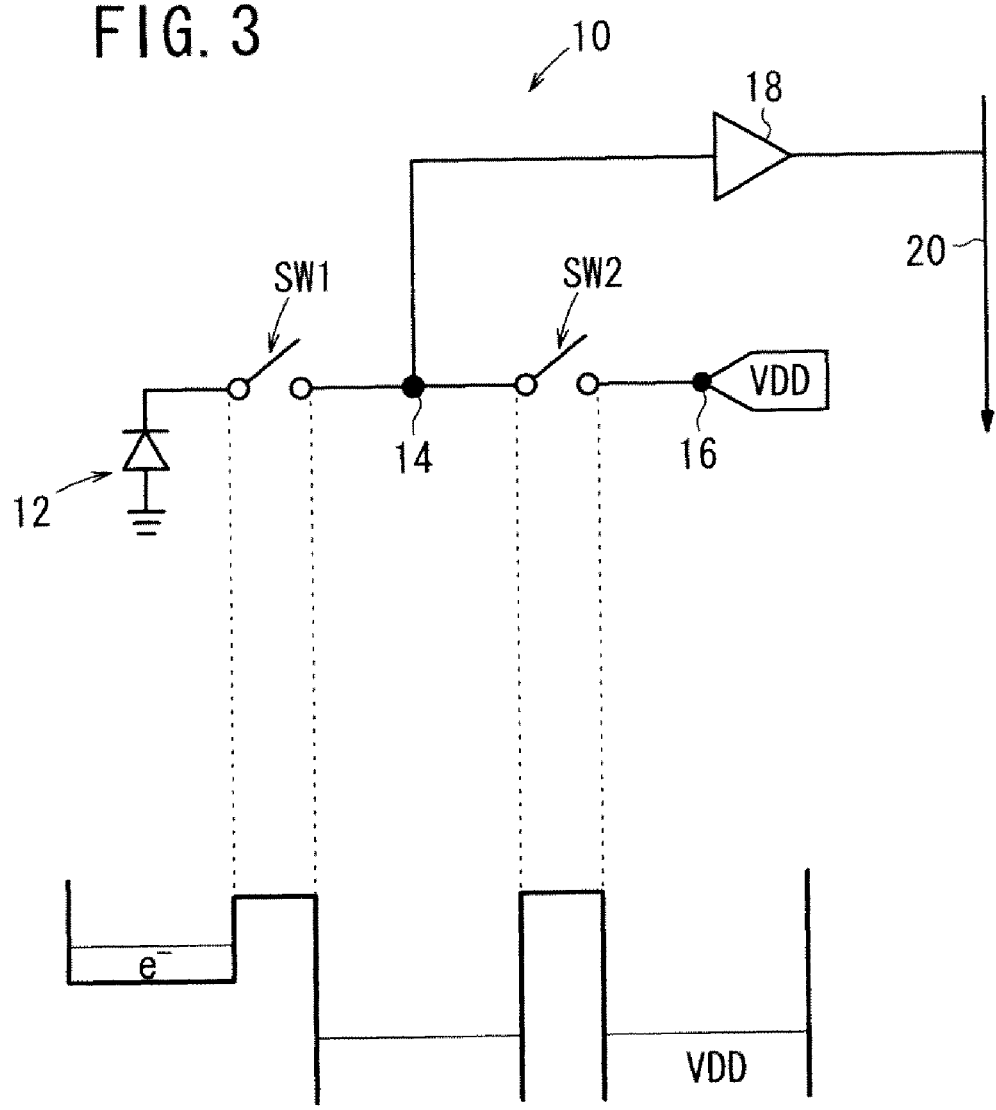
FIG. 3 is a circuit status diagram and a potential diagram of the pixel at an exposure timing B shown in FIG. 1.

FIG. 3 is a circuit status diagram and a potential diagram of the pixel 10 at an exposure timing B shown in FIG. 1. At the exposure timing B, a high level signal is not supplied, but a signal, which is of a low level (0), is supplied to the first switching element SW1 and the second switching element SW2, thereby turning off the first switching element SW1 and the second switching element SW2. As can be seen from the potential diagram illustrated below the circuit status diagram in FIG. 3, a potential barrier is formed between the photodetector 12 and the FD 14, as well as between the FD 14 and the photoelectron discharger 16. After the pixel-resetting timing A and until a photoelectron is transferred to the FD 14, the pixel 10 is exposed to light (i.e., the photodetector 12 generates a photoelectron by light applied to the pixel 10) and a photoelectron is stored in the photodetector 12.

Figure 4:
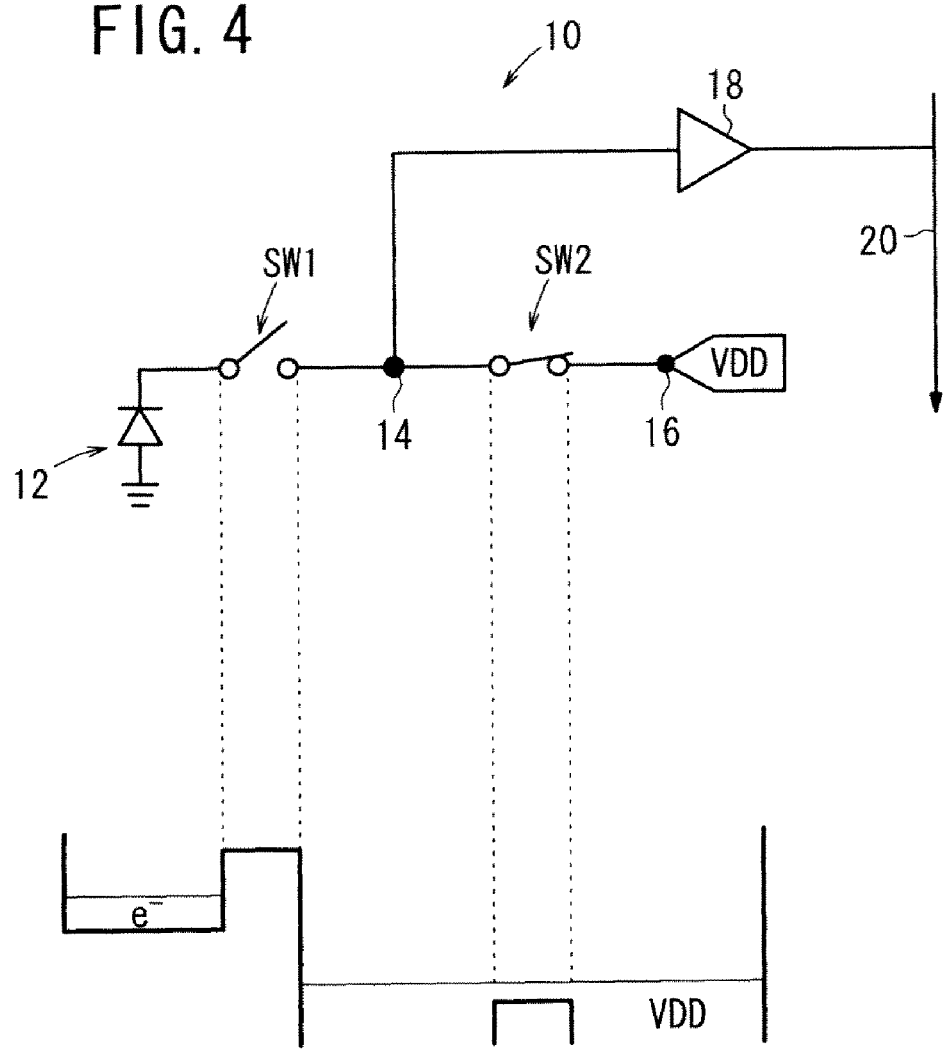
FIG. 4 is a circuit status diagram and a potential diagram of the pixel at an FD (Floating Diffusion) resetting timing C shown in FIG. 1.

FIG. 4 is a circuit status diagram and a potential diagram of the pixel 10 at an FD resetting timing C shown in FIG. 1. At the FD resetting timing C, a pixel charge transfer signal, which is of a low level, is supplied to the first switching element SW1, and an image resetting signal, which is of a high level, is supplied to the second switching element SW2, thereby turning off the first switching element SW1 and turning on the second switching element SW2. As can be seen from the potential diagram illustrated below the circuit status diagram in FIG. 4, the photoelectron remains stored in the photodetector 12, while only the photoelectron, which resides in the FD 14, is discharged from the photoelectron discharger 16. The photoelectron that resides in the FD 14 is discharged because it is necessary to reset the FD 14 before the photoelectron stored in the photodetector 12 is transferred to the FD 14. The voltage signal of a reset pixel is referred to as a voltage signal having a black level. In the pixel 10 shown in FIGS. 2 through 5, the black level voltage signal refers to a signal representing the voltage of the FD 14, which has been reset.

Figure 5:
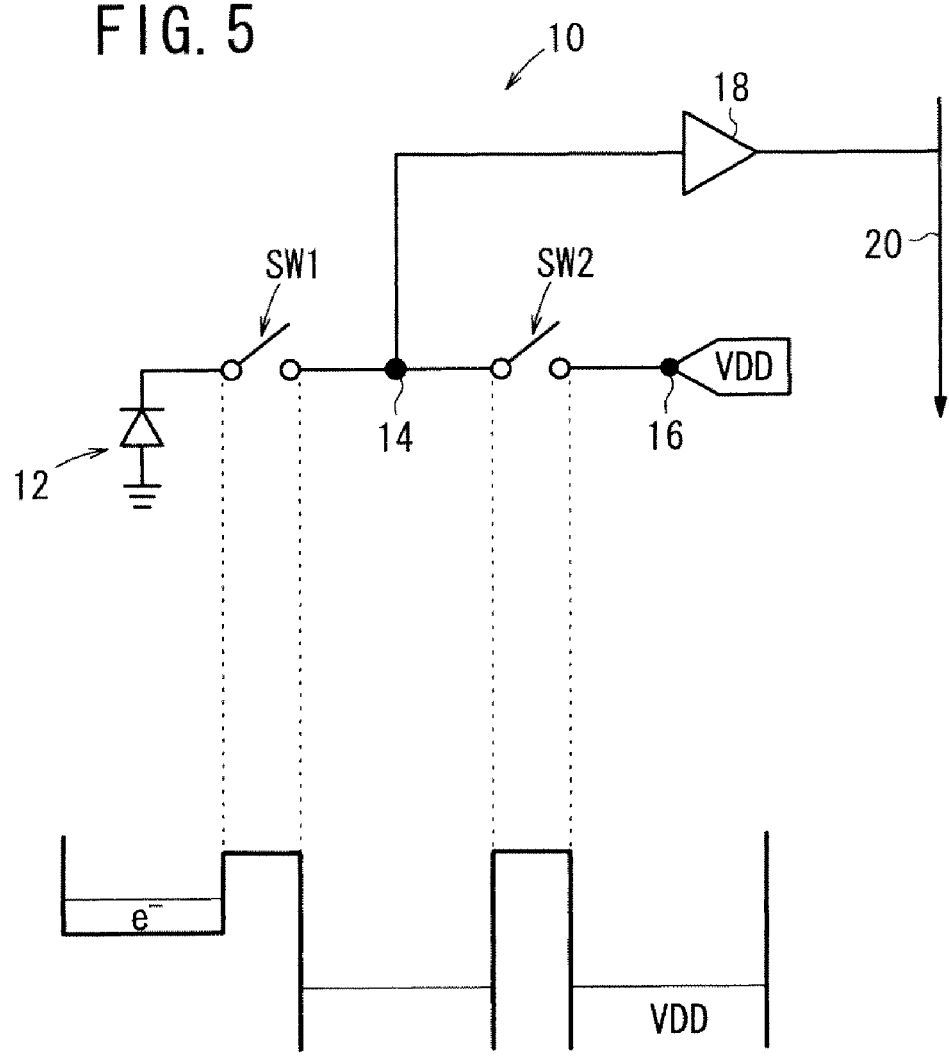
FIG. 5 is a circuit status diagram and a potential diagram of the pixel at a black level reading period timing D shown in FIG. 1.

FIG. 5 is a circuit status diagram and a potential diagram of the pixel 10 at a black level reading period timing D shown in FIG. 1. At the black level reading period timing D, a signal, which is of a low level, is supplied to the first switching element SW1 and the second switching element SW2, thereby turning off the first switching element SW1 and the second switching element SW2. As can be seen from the potential diagram illustrated below the circuit status diagram in FIG. 5, a potential barrier is formed between the photodetector 12 and the FD 14, as well as between the FD 14 and the photoelectron discharger 16. After the pixel 10 is reset (i.e., at the black level reading period timing D), an analog signal, e.g., a voltage signal, of the FD 14 (i.e., an analog signal having a black level) is read through the vertical signal line 20. At this time, circuits such as the pixel amplifier 18, a comparator 62 to be described later, etc., tend to induce random noise in the read analog signal that has a black level. Therefore, the black level is liable to vary at different timings.

Figure 6:
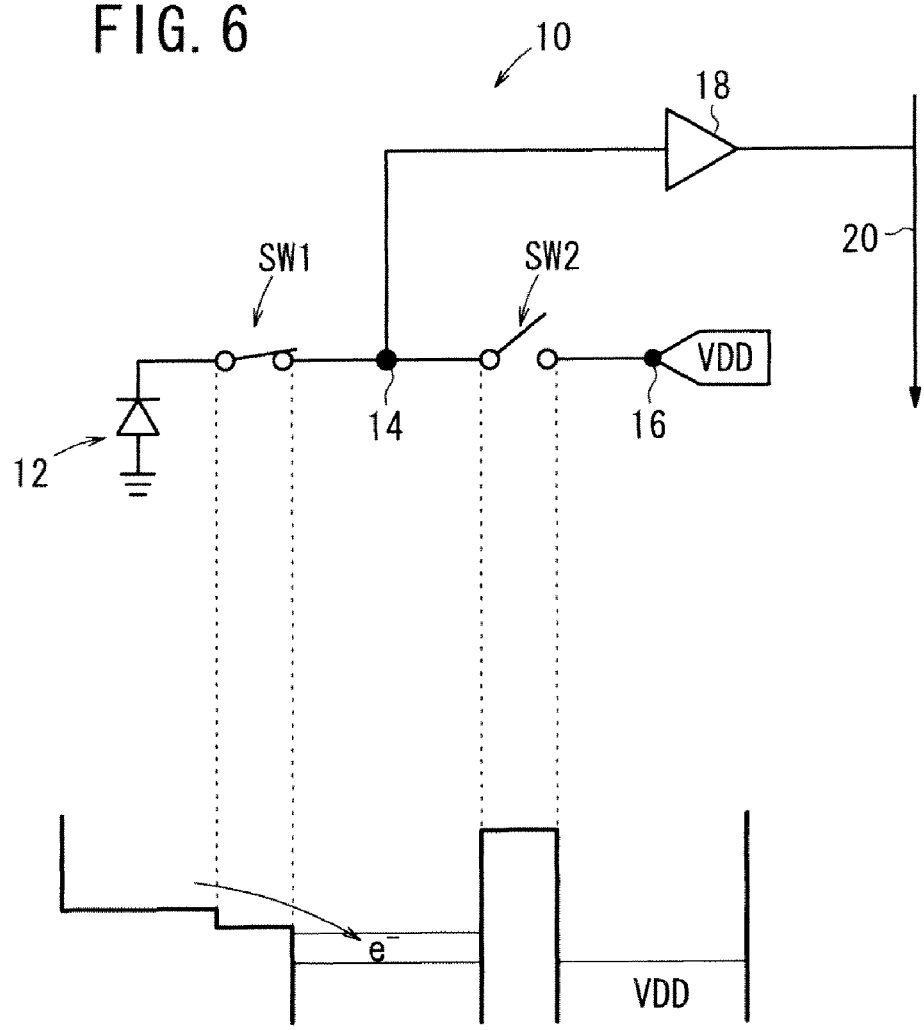
FIG. 6 is a circuit status diagram and a potential diagram of the pixel at a pixel reading period timing E shown in FIG. 1.

FIG. 6 is a circuit status diagram and a potential diagram of the pixel 10 at a pixel reading period timing E shown in FIG. 1. At the pixel reading period timing E, a pixel charge transfer signal, which is of a high level, is supplied to the first switching element SW1, and an image resetting signal, which is of a low level, is supplied to the second switching element SW2, thereby turning on the first switching element SW1 and turning off the second switching element SW2. As can be seen from the potential diagram illustrated below the circuit status diagram in FIG. 6, the photoelectron stored in the photodetector 12 is transferred to the FD 14.

Thereafter, the first switching element SW1 is turned off, and the analog signal, e.g., the voltage signal, of the FD 14 (i.e., an analog signal of the pixel 10, which is produced by exposure to applied light, or in other words, an analog signal having a signal level) is read through the vertical signal line 20. At this time, circuits such as the pixel amplifier 18, the comparator 62, etc., tend to induce random noise in the read analog signal having a signal level. Therefore, the signal level is liable to vary with time. Thereafter, a counter device 66 (to be described later) generates a digital signal, which represents a signal from the pixel itself, by subtracting the black level from the signal level. However, due to random noise, which is added by the pixel amplifier 18, the comparator 62, etc., to the black level and the signal level, it is not possible for the counter device 66 to generate a digital signal that accurately represents a signal from the pixel itself.

According to the present embodiment, an analog signal having a black level is converted into a digital signal M times, and an analog signal having a signal level is converted into a digital signal N times, for thereby enabling generation of a digital signal that accurately represents a signal from the pixel itself, and shortening the time required to convert analog signals into digital signals. In this case, the values of N and M satisfy the relationship $N \leq M$, where N includes 1, and N, M represent positive numbers.

Figure 7:
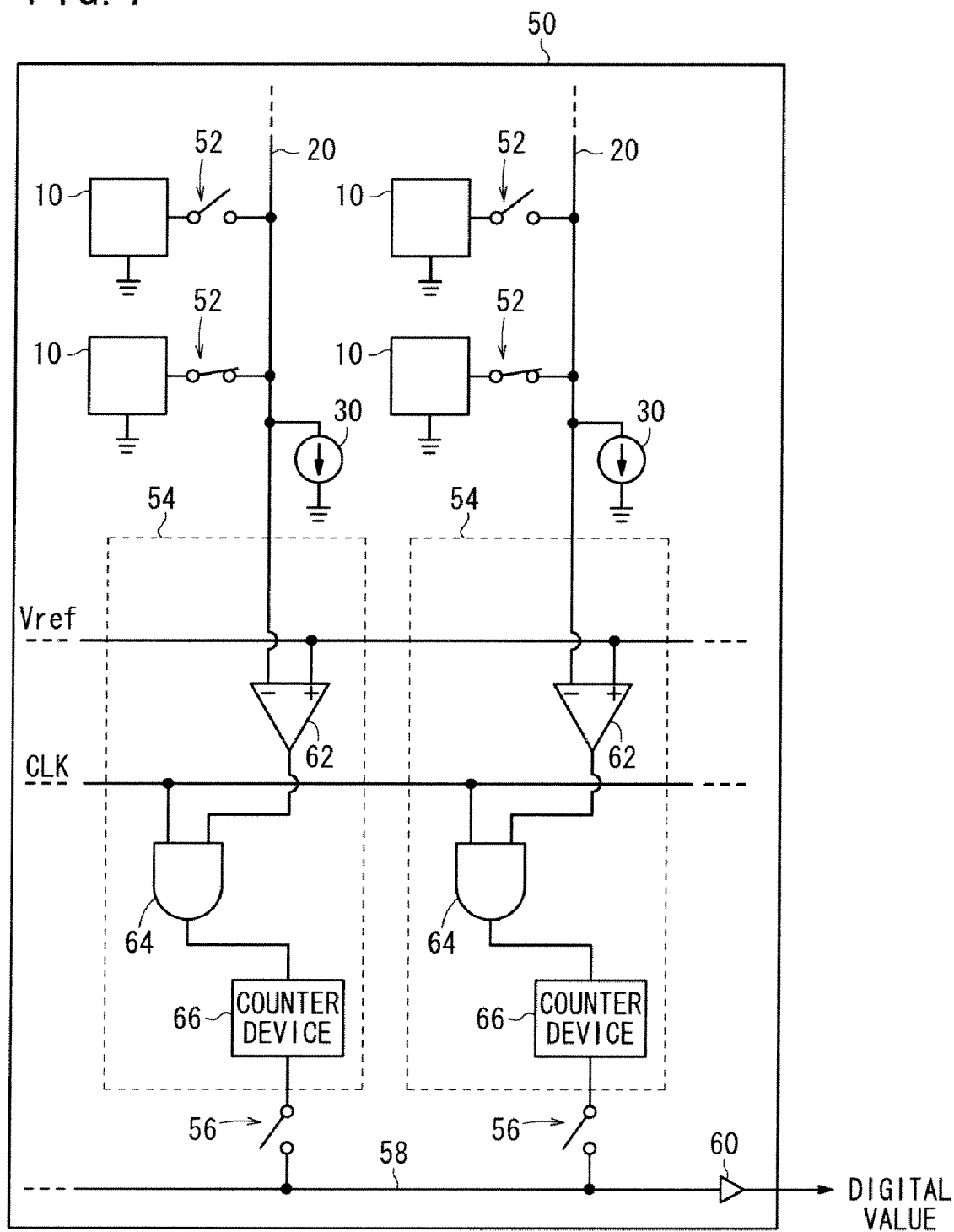
FIG. 7 is a circuit diagram, partially in block form, of a solid-state image sensing device according to an embodiment of the present invention.

FIG. 7 is a circuit diagram, partially in block form, of a solid-state image sensing device according to the present embodiment. As shown in FIG. 7, the solid-state image sensing device is denoted by 50 and comprises a matrix of pixels 10 arranged in rows and columns, a plurality of vertical signal lines 20 extending along respective columns of pixels 10, and which are connected to the pixels 10 along the columns by switches 52, a plurality of integrating A/D converters 54 connected to the respective vertical signal lines 20, a horizontal transfer line 58 connected respectively by switches 56 to the integrating A/D converters 54, and an output circuit 60 connected to an end of the horizontal transfer line 58. The switches 52 are capable of selecting one of the rows of pixels 10, which is to be read. The switches 56 are capable of selecting one of the columns of pixels 10, which is to be read. A pixel signal is read from the pixel 10, which is positioned at an intersection of the selected row of pixels 10 and the selected column of pixels 10.

Each of the integrating A/D converters 54 comprises a comparator 62, an AND gate 64, and a counter device 66. Each of the integrating A/D converters 54 reads a pulse train depending on an analog signal read through the vertical signal line 20, counts the pulses of the read pulse train, and converts the analog signal into a digital signal.

The analog signal read through the vertical signal line 20 is supplied to a negative input terminal of the comparator 62, whereas a reference voltage Vref is supplied to a positive input terminal of the comparator 62. If the reference voltage Vref is higher than the analog signal, then the comparator 62 outputs a high-level signal. If the reference voltage Vref is lower than the analog signal, then the comparator 62 outputs a low-level signal. The solid-state image sensing device 50 may include a reference voltage generator, which generates and supplies the reference voltage Vref to the positive input terminal of the comparator 62. Alternatively, a circuit that is external to the solid-state image sensing device 50 may generate and supply the reference voltage Vref to the positive input terminal of the comparator 62. Current sources 30 for driving the pixels 10 are connected respectively to the vertical signal lines 20.

The comparator 62 applies an output signal to an input terminal of the AND gate 64. Another input terminal of the AND gate 64 is supplied with a clock signal, i.e., a pulse train. The clock signal may be a reference clock signal, or may be a clock signal generated from a reference clock signal. The AND gate 64 outputs the supplied clock signal while the output signal from the comparator 62 is high in level. In other words, the AND gate 64 outputs the supplied clock signal while the reference voltage Vref is higher than the analog signal. In this manner, the integrating A/D converter 54 reads a pulse train depending on the analog signal read through the vertical signal line 20. The solid-state image sensing device 50 may include a clock generator, which generates and outputs the clock signal to the AND gate 64. Alternatively, a circuit that is external to the solid-state image sensing device 50 may generate and supply the clock signal to the AND gate 64.

The counter device 66 counts pulses of the pulse train that is output from the AND gate 64. As described above, when an analog signal having a black level is read through the vertical signal line 20, the AND gate 64 outputs a pulse train (first pulse train) to the counter device 66 that depends on the analog signal having a black level. Further, when an analog signal having a signal level is read through the vertical signal line 20, the AND gate 64 outputs a pulse train (second pulse train) to the counter device 66 that depends on the analog signal having a signal level.

The counter device 66 counts the pulses of the first pulse train, counts the pulses of the second pulse train, and subtracts the pulse count value of the first pulse train from the pulse count value of the second pulse train, thereby generating a digital signal that represents a signal from the pixel itself, i.e., a signal produced by subtracting the black level from the signal level. The counter device 66 then supplies the generated digital signal, which represents a differential count value, through the switch 56 and the horizontal transfer line 58 to the output circuit 60, from which the digital signal is output externally from the solid-state image sensing device 50.

Figure 8:
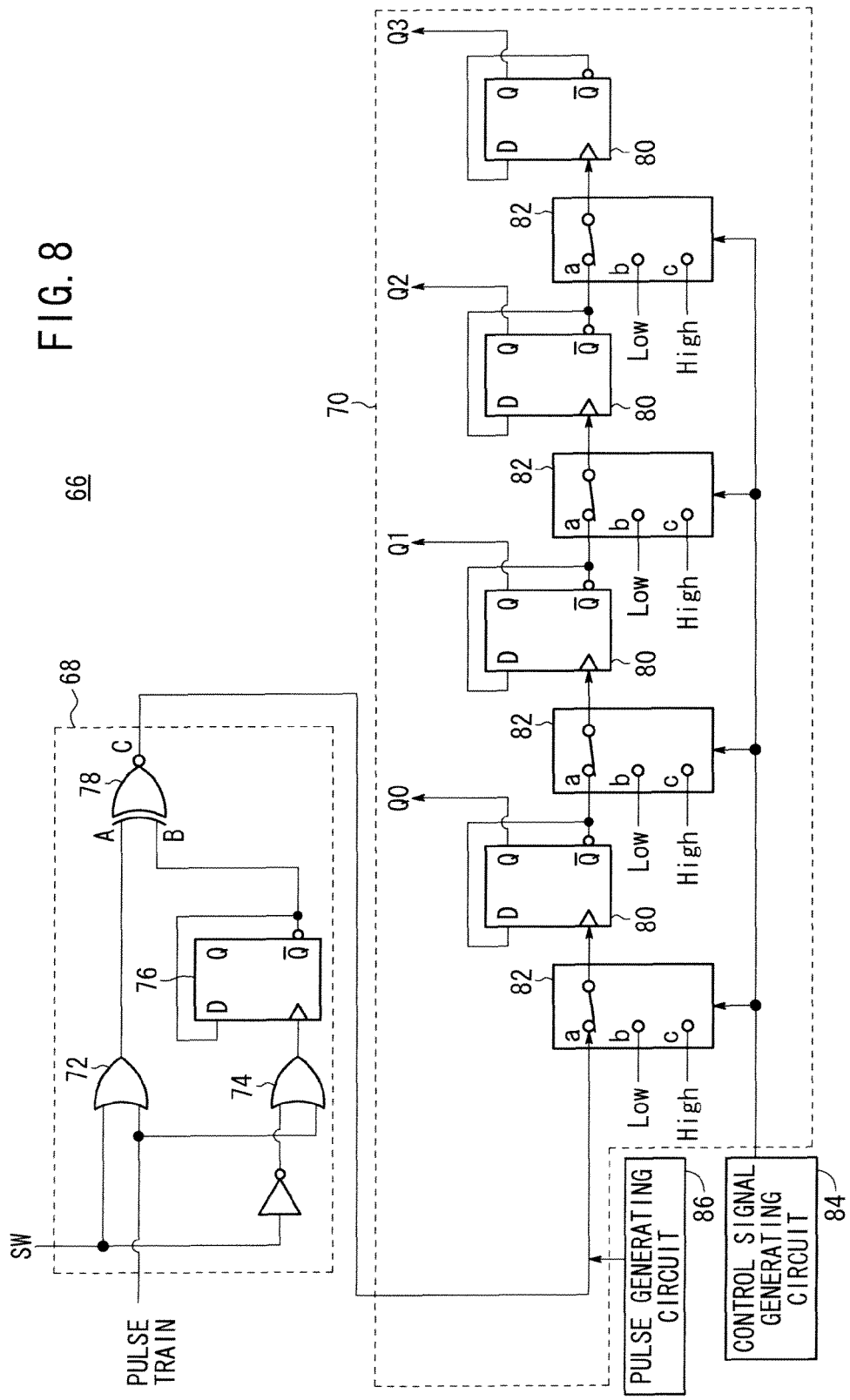
FIG. 8 is a block diagram of a circuit arrangement of a counter device shown in FIG. 7.

FIG. 8 is a block diagram of a circuit arrangement of the counter device 66 shown in FIG. 7. As shown in FIG. 8, the counter device 66 comprises a frequency divider 68, and a bit-flip asynchronous counter circuit (hereinafter referred to as a "counter circuit") 70. The frequency divider 68 switches between a state in which the first pulse train and the second pulse train are not frequency-divided and the frequency divider 68 outputs the first pulse train and the second pulse train as is to the counter circuit 70, and another state in which the frequency divider 68 frequency-divides the first pulse train and the second pulse train and outputs the frequency-divided first and second pulse trains to the counter circuit 70. In other words, the frequency divider 68 switches the frequency dividing ratio thereof.

The counter circuit 70 counts the pulses of a pulse train output from the frequency divider 68, which is supplied with the first pulse train, and converts the pulse count value into a 2's complement. Thereafter, the counter circuit 70 counts the pulses of a pulse train output from the frequency divider 68, which is supplied with the second pulse train.

The frequency divider 68 comprises an OR gate 72, an OR gate 74, a positive-edge-triggered flip-flop 76, and an exclusive-NOR gate 78. The OR gate 72 is supplied with a switch signal SW, and the OR gate 74 is supplied with the switch signal SW after the switch signal SW has been inverted by a NOT gate or an inverter. The OR gates 72, 74 are also supplied with the first pulse train and the second pulse train. The OR gate 74 applies an output signal to a clock terminal CK of the flip-flop 76. The flip-flop 76 has an input terminal D connected to an inverting output terminal Q bar. The flip-flop 76 functions as a frequency divider. An output signal from the OR gate 72, and an output signal from the inverting output terminal Q bar of the flip-flop 76 are supplied respectively to the exclusive-NOR gate 78.

Figure 9:
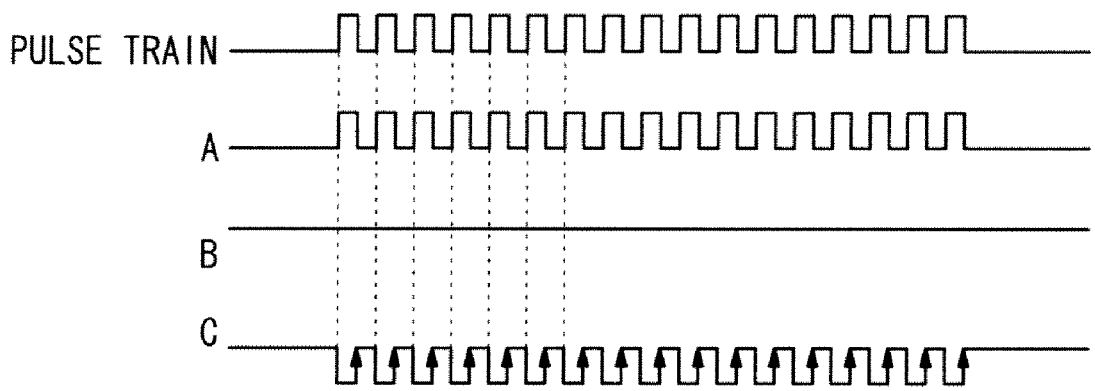
FIG. 9 is a diagram showing signals output from an OR gate, a flip-flop, and an exclusive-NOR gate of a frequency divider of the counter device, when a low signal is input as a switch signal to the counter device.

When a low-level signal is input as the switch signal SW to the frequency divider 68, the OR gate 72 outputs the pulse train supplied thereto as is to the exclusive-NOR gate 78, while the OR gate 74 outputs a high-level signal to the flip-flop 76, as shown in FIG. 9. The flip-flop 76 outputs a high-level signal to the exclusive-NOR gate 78. Therefore, the exclusive-NOR gate 78 inverts the pulse train supplied to the OR gate 72 and then outputs the inverted pulse train. At this time, the frequency divider 68 outputs the pulses of the pulse train supplied thereto without frequency-dividing the pulse train. In FIG. 9, A represents the output signal from the OR gate 72, B represents the output signal from the flip-flop 76, and C represents the output signal from the exclusive-NOR gate 78.

Figure 10:
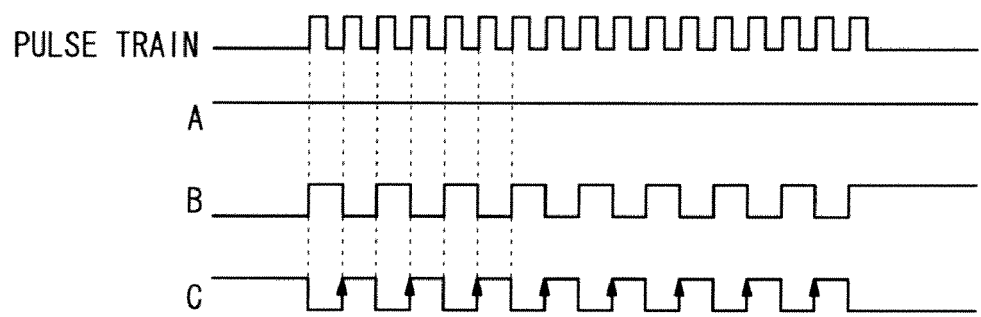
FIG. 10 is a diagram showing signals output from the OR gate, the flip-flop, and the exclusive-NOR gate of the frequency divider of the counter device, when a high signal is input as a switch signal to the counter device.

When a high-level signal is input as the switch signal SW to the frequency divider 68, the OR gate 72 outputs a high-level signal to the exclusive-NOR gate 78, and the OR gate 74 outputs the pulse train supplied thereto as is to the flip-flop 76. The flip-flop 76 frequency-divides the supplied pulse train by 2, and outputs the frequency-divided pulse train to the exclusive-NOR gate 78. The exclusive-NOR gate 78 inverts the pulse train from the flip-flop 76 and outputs an inverted pulse train. At this time, the frequency divider 68 outputs pulses of the pulse train supplied thereto, which has been frequency-divided by 2. In FIG. 10, A represents the output signal from the OR gate 72, B represents the output signal from the flip-flop 76, and C represents the output signal from the exclusive-NOR gate 78.

The counter circuit 70 comprises a plurality of positive-edge-triggered flip-flops 80 and a plurality of switch circuits 82. The solid-state image sensing device 50 also includes a control signal generating circuit 84 and a pulse generating circuit 86, as shown in FIG. 8. The control signal generating circuit 84 and the pulse generating circuit 86 respectively output a switch circuit control signal and one pulse (described later) to a plurality of counter circuits 70 in the solid-state image sensing device 50.

The flip-flops 80 count up the pulses of a pulse train. The switch circuits 82 and the flip-flops 80 are connected alternately to each other. Each of the flip-flops 80 may comprise a D-type flip-flop. The flip-flops 80 are connected in cascade by the switch circuits 82. Each of the flip-flops 80 has an input terminal D, which is connected to an inverting output terminal Q bar. The output signal from the inverting output terminal Q bar of each flip-flop 80, with the exception of the flip-flop 80 of the most significant bit, is input to a switch circuit 82, which follows the flip-flop 80.

The output signal from an output terminal Q of each flip-flop 80 serves as one bit of the count value that is produced by the counter circuit 70. The output signal from the output terminal Q of the first flip-flop 80 (i.e., the leftmost flip-flop 80 in FIG. 8) is represented by Q0, the output signal from the output terminal Q of the second flip-flop 80 is represented by Q1, the output signal from the output terminal Q of the third flip-flop 80 is represented by Q2, and the output signal from the output terminal Q of the fourth (final) flip-flop 80 of the most significant bit is represented by Q3.

The counter circuit 70 includes as many flip-flops 80 and switch circuits 82 as the number of bits that make up the count value. In FIG. 8, the counter circuit 70 includes four flip-flops 80 and four switch circuits 82. Therefore, the count value produced by the counter circuit 70 comprises four bits. The output signal Q3 from the fourth (final) flip-flop 80 of the most significant bit also functions as a sign bit.

The switch circuits 82 are connected as previous stages of the respective flip-flops 80. Each of the switch circuits 82 selects a propagated signal In, or a low-level signal (0), or a high-level signal (1) that are input thereto, and outputs the selected signal as an output signal Out to the clock terminal CK of the flip-flop 80, which follows the switch circuit 82. The first switch circuit 82, i.e., the rightmost switch circuit 82 shown in FIG. 8, is supplied with the pulse train, which is to be counted, as the propagated signal In. Further, each of the switch circuits 82, with the exception of the first switch circuit 82, is supplied with the output signal from the inverting output terminal Q bar of the previous flip-flop 80 as the propagated signal In. Each of the switch circuits 82 comprises a 2-to-1 selector. Details of the switch circuits 82 will be described later.

The control signal generating circuit 84 generates a switch circuit control signal BR for controlling each switch circuit 82 to select the propagated signal In, or the low-level signal, or the high-level signal. The control signal generating circuit 84 generates the switch circuit control signal BR using a reference clock signal, or a clock signal that is generated from a reference clock signal. Based on the switch circuit control signal BR, which is generated by the control signal generating circuit 84, each of the switch circuits 82 selects the propagated signal In, or the low-level signal, or the high-level signal, and outputs the selected signal as the output signal Out.

When the switch circuits 82 output the propagated signal In as the output signal Out, the flip-flops 80 count the pulses of the pulse train that is input to the first switch circuit 82. Thereafter, the control signal generating circuit 84 controls the switch circuits 82 to output a low-level signal, and then controls the switch circuits 82 to output a high-level signal. As a result, the count value produced by the flip-flops 80 is converted into a 1's complement. In other words, a 1's complement of the count value produced by the flip-flops 80 is stored by the flip-flops 80.

The pulse generating circuit 86 generates one pulse for converting the count value produced by the flip-flops 80 into a 2's complement, and inputs the one pulse to the first switch circuit 82. After the count value is converted into a 1's complement, and then the switch circuits 82 output the propagated signal In as the output signal Out, the one pulse is input to the first switch circuit 82, thereby converting the count value into a 2's complement. Thus, the 2's complement is stored in the flip-flops 80.

Figure 11:
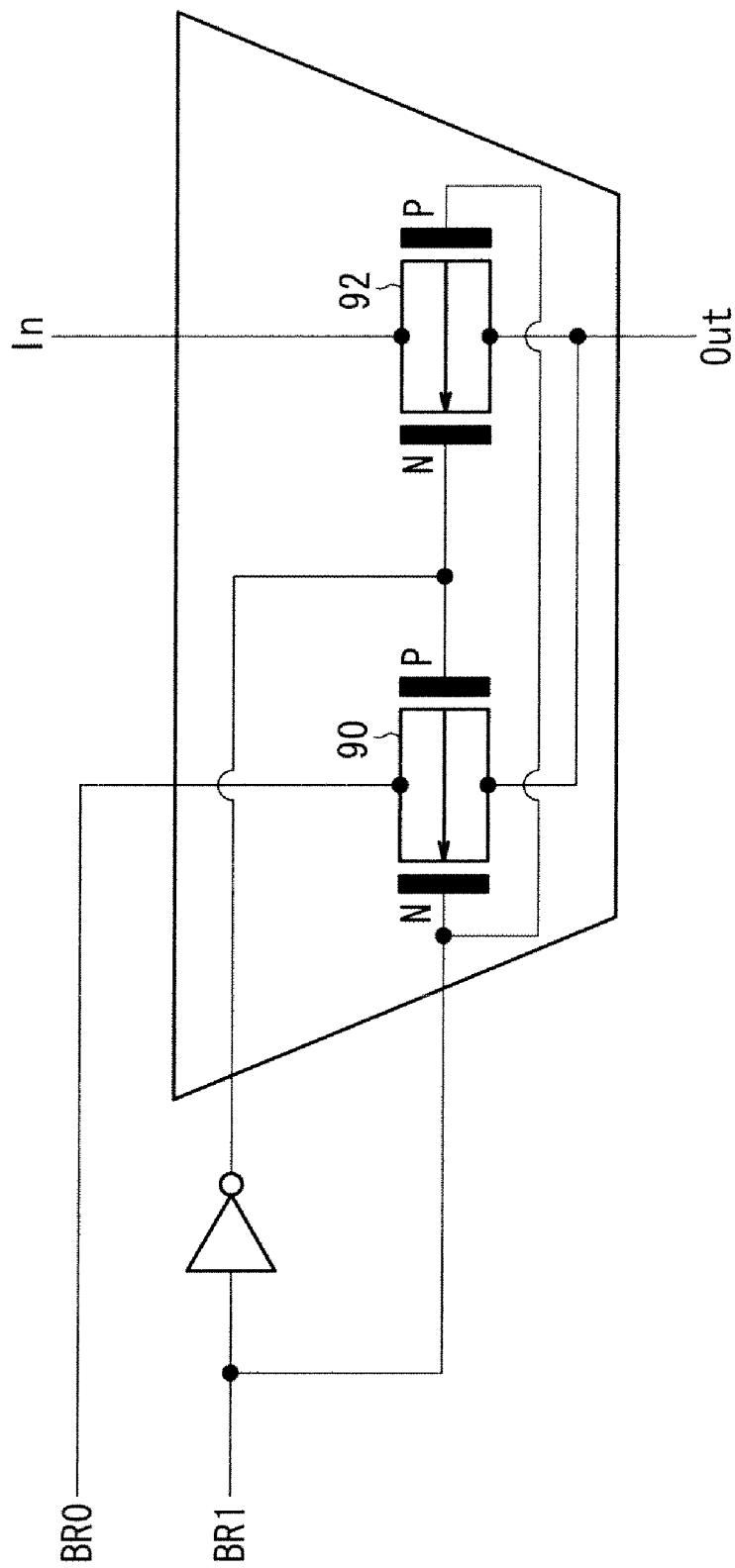
FIG. 11 is a circuit diagram of a switch circuit shown in FIG. 8.

FIG. 11 is a circuit diagram of each of the switch circuits 82 shown in FIG. 8. The switch circuit 82 functions as a 3-to-1 selector, since the switch circuit 82 selects and outputs the propagated signal In, or the low-level signal, or the high-level signal. However, the switch circuit 82 is constructed as a 2-to-1 selector. As shown in FIG. 11, the switch circuit 82 comprises a first transfer gate 90 and a second transfer gate 92. The switch circuit control signal BR has a first control signal BR0, which is input to the first transfer gate 90, for converting the count value of the flip-flops 80 into a first complement, and a second control signal BR1, which is used for turning on and off the first transfer gate 90 and the second transfer gate 92. When the second control signal BR1 is applied to the first transfer gate 90 and the second transfer gate 92, the first transfer gate 90 and the second transfer gate 92 are turned on and off in a mutually opposite manner. For example, when the first transfer gate 90 is turned on, the second transfer gate 92 is turned off. The propagated signal In is input to the second transfer gate 92.

Each of the first transfer gate 90 and the second transfer gate 92 comprises a CMOS switch, including an N-channel transistor N and a P-channel transistor P. The second control signal BR1 is directly applied to the gate of the transistor N of the first transfer gate 90, and to the gate of the transistor P of the second transfer gate 92. A signal produced by inverting the second control signal BR1 is directly applied to the gate of the transistor P of the first transfer gate 90, and to the gate of the transistor N of the second transfer gate 92. This arrangement makes it possible for the first transfer gate 90 and the second transfer gate 92 to be turned on and off in a mutually opposite manner. The first control signal BR0 and the second control signal BR1 control the output signal Out from the switch circuit 82.

Figure 12:
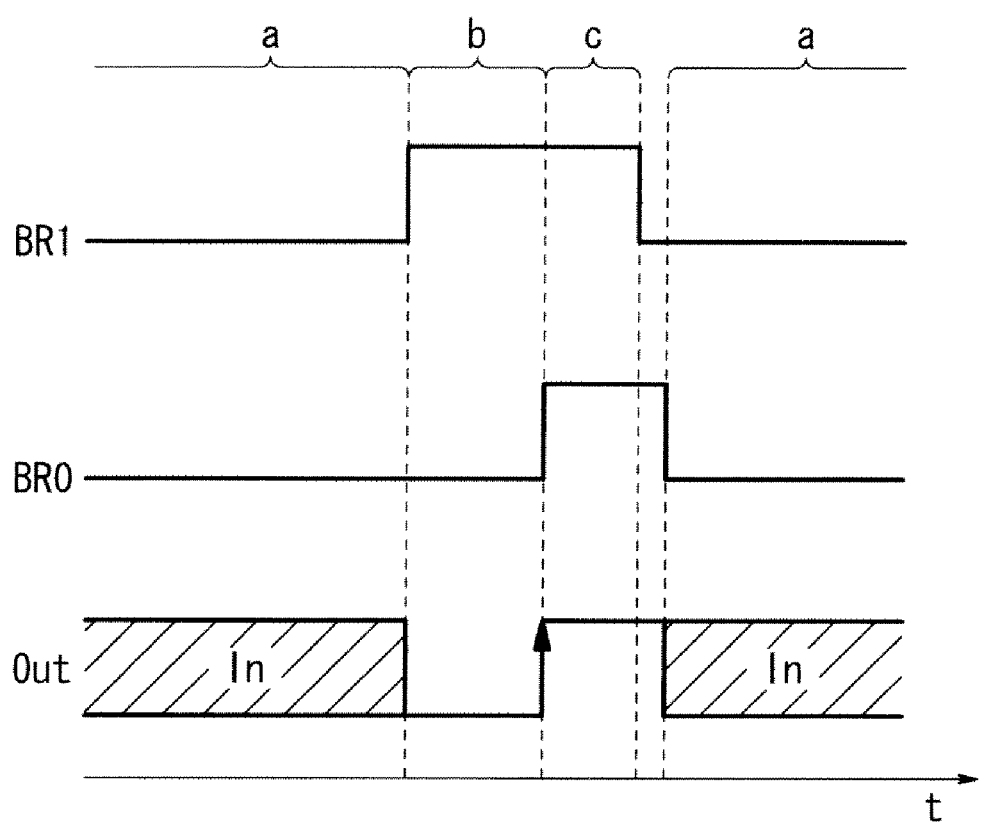
FIG. 12 is a diagram showing the waveform of a signal that is output from the switch circuit when a switch circuit control signal BR is applied to the switch circuit.

FIG. 12 is a diagram showing the waveform of the output signal Out from the switch circuit 82, at a time when the switch circuit control signal BR is applied to the switch circuit 82. As shown in FIG. 2, when the first control signal BR0 and the second control signal BR1 are low in level, the first transfer gate 90 is turned off and the second transfer gate 92 is turned on. Further, if the propagated signal In is input to the second transfer gate 92, then the switch circuit 82 outputs the propagated signal In as the output signal Out. A state in which the first control signal BR0 and the second control signal BR1 are low in level is referred to as a state "a".

In the state "a", the switch circuit control signal BR makes it possible for the propagated signal In to be input from each switch circuit 82 to the clock terminal CK of the following flip-flop 80.

Then, the first control signal BR0 remains low in level while the second control signal BR1 goes high in level. Since at this time, the first transfer gate 90 is turned on and the second transfer gate 92 is turned off, the switch circuit 82 outputs the first control signal BR0, which is input to the first transfer gate 90, as the output signal Out. Since the first control signal BR0, which is input to the first transfer gate 90, is low in level, the output signal Out also is low in level. A state in which the first control signal BR0 is low in level whereas the second control signal BR1 is high in level is referred to as a state "b". In the state "b", the switch circuit control signal BR makes it possible for the low-level output signal Out to be input from each switch circuit 82 to the clock terminal CK of the following flip-flop 80.

Then, the second control signal BR1 remains high in level, while the first control signal BR0 goes high in level. Since at this time, the first transfer gate 90 is turned on and the second transfer gate 92 remains turned off, the switch circuit 82 outputs the first control signal BR0, which is input to the first transfer gate 90, as the output signal Out. Further, since the first control signal BR0, which is input to the first transfer gate 90, is high in level, the output signal Out also is high in level. A state in which the first control signal BR0 and the second control signal BR1 both are high in level is referred to as a state "c". In the state "c", the switch circuit control signal BR makes it possible for the high-level output signal Out to be input from each switch circuit 82 to the clock terminal CK of the following flip-flop 80. When the state "b" switches to the state "c", the output signal Out of the switch circuit 82 switches from a low level to a high level. Therefore, the state value of each flip-flop 80 becomes inverted. In other words, the count value is converted into a 1's complement.

The switch circuit 82 changes from the state "a" to the state "b", and then to the state "c" and back to the state "a". When the switch circuit 82 returns from the state "c" to the state "a", the timing at which the first control signal BR0 changes from the high level to the low level is delayed, i.e., occurs after the timing at which the second control signal BR1 changes from the high level to the low level, in order to prevent the output signal Out from suffering from hazards.

Figure 13:
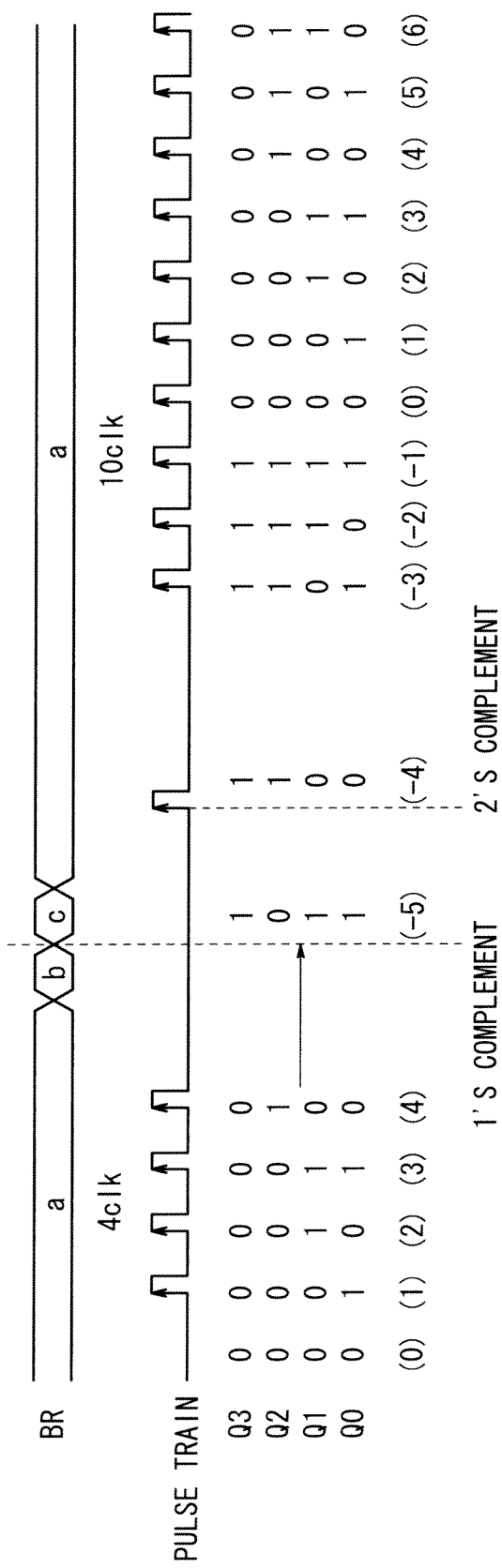
FIG. 13 is a timing chart of an operation sequence of a counter circuit shown in FIG. 8.

FIG. 13 is a timing chart of an operation sequence of the counter circuit 70 shown in FIG. 8. In FIG. 13, it is assumed that the frequency divider 68 outputs the first pulse train and the second pulse train that have been input thereto as is to the first switch circuit 82 of the counter circuit 70. The first pulse train is a pulse train that is counted down, and which depends on an analog signal having a black level (pixel-resetting component) from a pixel. In other words, the number of pulses of the first pulse train is determined depending on an analog signal having a black level. The second pulse train is a pulse train that is counted up, and which depends on an analog signal having a signal level from a pixel. The number of pulses of the second pulse train is determined depending on an analog signal having a signal level.

During a first period (first A/D conversion period), during which the pulses of the first pulse train are counted, the switch circuit control BR brings the switch circuit 82 into the state "a". The first pulse train is input to the first switch circuit 82. Before the counter circuit 70 counts the pulses of the first pulse train, the counter circuit 70 is initialized so as to render the signals output from the output terminals Q low. In other words, all of the flip-flops 80 are reset in order to set the output signals from the output terminals Q to "0".

When the first pulse train is input to the first switch circuit 82, the counter circuit 70 begins to count the pulses of the first pulse train. For example, when a pulse is input to the first switch circuit 82, since the output signal Q0 has a value of "1"

and the output signals Q1, Q2, Q3 have respective values of "0", the count value of the counter circuit 70 becomes "0001" (1). Then, as successive pulses are input to the first switch circuit 82, the count value of the counter circuit 70 is incremented from "0001" (1) to "0010" (2) to "0011" (3) to "0100" (4), etc. The values in parentheses following the above count values in digital notation represent the count values as expressed in decimal notation.

After elapse of the first period, the switch circuit control signal BR brings the switch circuit 82 into the state "b", and then into the state "c". At this time, the state values held by the respective flip-flops 80 are inverted. In other words, the present count value is converted into a 1's complement. In FIG. 13, the state values are inverted after the count value has reached "0100". Therefore, the inverted count value is represented by "1011" (11). As described above, the count value of the flip-flop 80 of the most significant bit functions as a sign bit. When the output signal Q3 is of a value "0", the value of the output signal Q3 indicates positive, and when the output signal Q3 is of a value "1", the value of the output signal Q3 indicates negative. Assuming that the count value "1011" is expressed as a 2's complement in decimal notation, then the count value becomes −5.

After the count value is converted into a 1's complement, the counter circuit 70 enters a second period (second A/D conversion period) during which the pulses of the second pulse train are counted. The switch circuit control signal BR brings the switch circuit 82 into the state "a". In the second period, the pulse generating circuit 86 inputs one generated pulse to the first switch circuit 82 before the second pulse train is input thereto. At this time, the count value produced in the first period is converted into a 2's complement. When the one generated pulse is input to the first switch circuit 82, the count value "1011", which is a 1's complement, is incremented by +1. In other words, the count value produced in the first period is converted into a 2's complement. The count value after having been converted into a 2's complement is represented by "1100" (−4). Thereafter, when the second pulse train is input to the first switch circuit 82, the counter circuit 70 counts the pulses of the second pulse train from its current value of −4.

By converting the count value, which is produced by counting the pulses of the first pulse train, into a 1's complement, and then converting the count value into a 2's complement, the result obtained by counting up the pulses of the first pulse train is the same as the result obtained by counting down the pulses of the first pulse train. Therefore, since the first pulse train is a pulse train that depends on the resetting component of the pixel, and the second pulse train is a pulse train that depends on the signal level of the pixel, the final count value is a count value representing "−resetting component+signal level", thus making it possible to obtain a signal component of the pixel itself.

Inasmuch as the output signal Q3 from the flip-flop 80 of the most significant bit functions as a sign bit, the maximum number of bits that can be counted is equal to the number of flip-flops 80, except for the flip-flop 80 of the most significant bit. Therefore, the number of flip-flops 80 used should be changed depending on the value that is to be counted. If each of the flip-flops 80 is a negative-edge-triggered flip-flop, then a control signal having a waveform, which is an inversion of the waveform of the first control signal BR0 shown in FIG. 12, is applied as the first control signal BR0 to the first transfer gate 90. Depending on the configuration of the flip-flops 80, the signals output from the switch circuits 82 can be varied. More specifically, the state value of each of the flip-flops 80 may be inverted when the first period switches to the second period.

Figure 14:
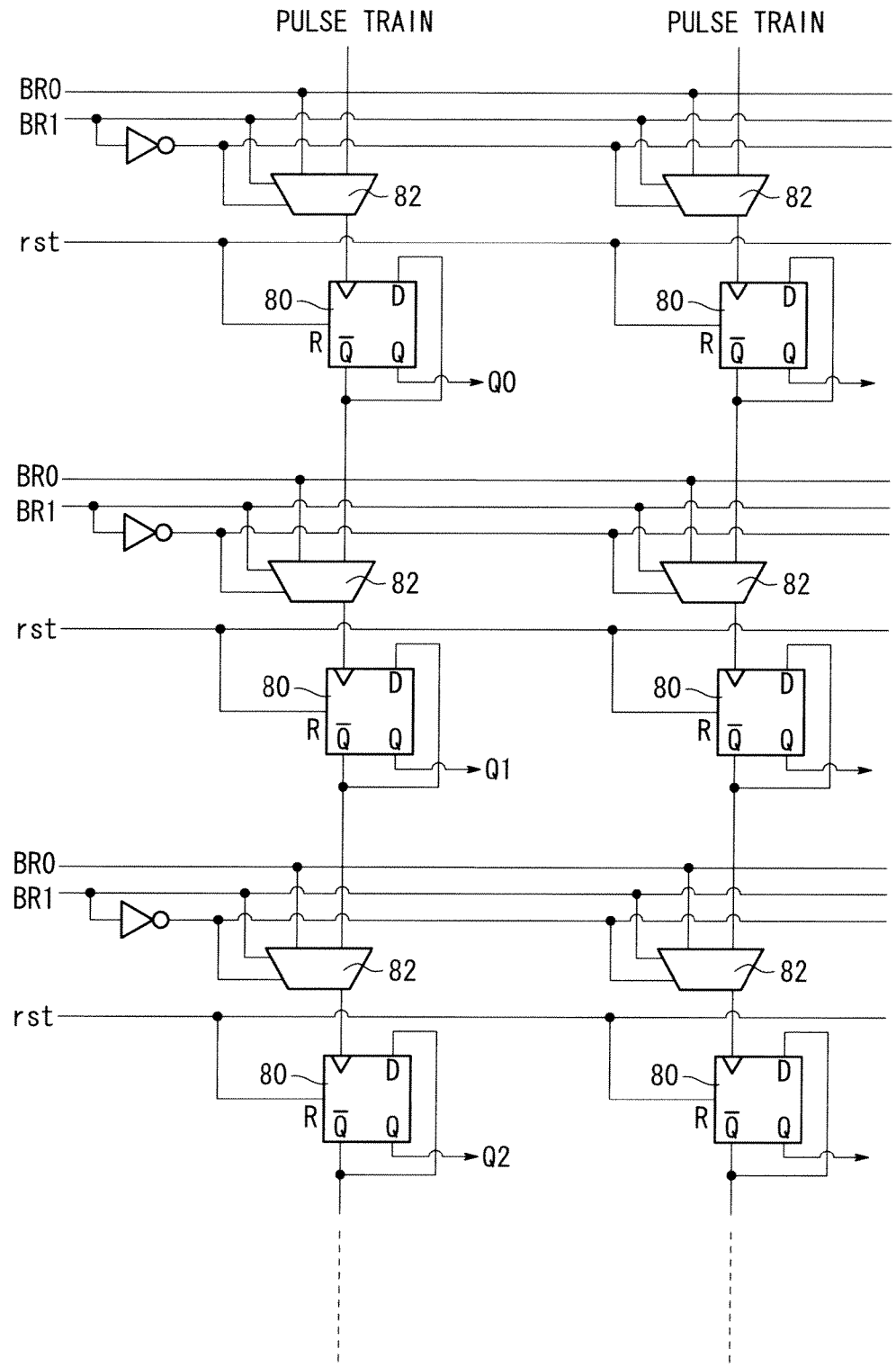
FIG. 14 is a block diagram of a plurality of counter circuits connected in a parallel layout.

FIG. 14 is a block diagram of a plurality of counter circuits 70 connected in a parallel layout. The counter circuits 70 are positioned in association with the respective columns of pixels of the solid-state image sensing device. As shown in FIG. 14, with counter circuits 70 having a large number of bits, if the size of each of the switch circuits 82 is made smaller, then the installation area taken up by the counter circuits 70 can be reduced. According to the present invention, since each of the switch circuits 82, each of which are constructed as a 2-to-1 selector, functions as a 3-to-1 selector, the switch circuits 82 are smaller in size than they would be if constructed as a 3-to-1 selector, thereby resulting in a reduction in size of the installation area taken up by the counter circuits 70. In FIG. 14, the control signal generating circuit 84 and the pulse generating circuit 86 have been omitted from illustration. A resetting signal rst is input to each of the flip-flops 80. When the resetting signal rst is input to the flip-flops 80, the flip-flops 80 are initialized, so as to set the output signals from the output terminals Q to "0".

Figure 15:
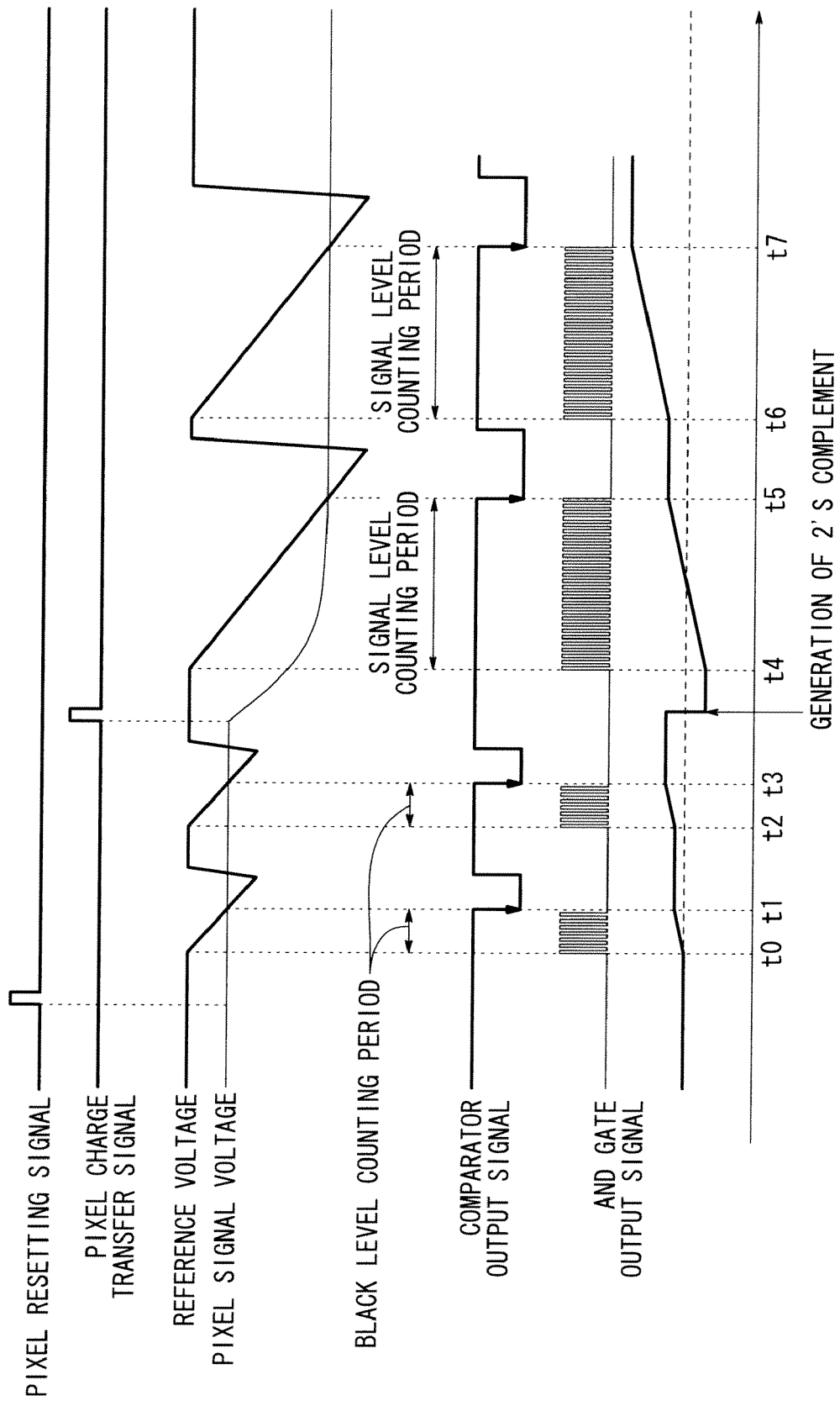
FIG. 15 is a timing chart of an operation sequence of the solid-state image sensing device.

FIG. 15 is a timing chart of an operation sequence of the solid-state image sensing device 50. It is assumed that a high-level switch signal is input to the frequency divider 68. When a pixel-resetting signal is supplied to the second switching element SW2 of the pixel 10, thus entering the first A/D conversion period during which an analog signal having a black level is converted into a digital signal, an analog signal having a black level is read from the pixel 10 through the pixel amplifier 18 and the vertical signal line 20, and the analog signal is input to the negative input terminal of the comparator 62. The reference voltage Vref varies stepwise over time in a sawtooth (ramp) waveform. In order to read an analog signal having a black level repeatedly two times, i.e., in order to read a pulse train depending on an analog signal having a black level repeatedly two times, during the first A/D conversion period, a voltage represented by two successive waveform ramps is input as the reference voltage Vref to the positive input terminal of the comparator 62.

In synchronism with the first waveform ramp of the reference voltage Vref (at t0 in FIG. 15), the counter circuit 70 counts the pulses of a pulse train depending on an analog signal having a black level, which is output from the AND gate 64 (i.e., pulses of the first pulse train), until the reference voltage Vref becomes lower than the voltage of the analog signal having a black level (until t1 in FIG. 15). Further, it is assumed that all of the flip-flops 80 of the counter circuit 70 have been reset to "0" before the counter circuit 70 counts the pulses of the pulse train depending on an analog signal having a black level. Thereafter, in synchronism with the second waveform ramp of the reference voltage Vref (at t2 in FIG. 15), the counter circuit 70 again counts the pulses of the pulse train depending on the analog signal having a black level, which is output from the AND gate 64, until the reference voltage Vref becomes lower than the voltage of the analog signal having a black level (until t3 in FIG. 15).

Consequently, the counter circuit 70 counts the pulses of the pulse train depending on the analog signal having a black level, which is read repeatedly two times during the first A/D conversion period. Since the flip-flop 76 of the frequency divider 68 frequency-divides the pulse train input thereto by 2 and outputs the frequency-divided pulse train to the counter circuit 70, the counter circuit 70 eventually counts the pulses of the pulse train depending on one analog signal having a black level, even though the analog signal having a black level is read repeatedly two times. Since the count value produced by the counter circuit 70 represents an average of the analog signal having a black level that is read repeatedly two times, the counter circuit 70 can count the pulses of the pulse train depending on the analog signal having a black level more accurately. The greater the number of times that an analog signal having a black level is read repeatedly, the higher the accuracy with which the pulses of the pulse train can be counted. However, the pulse train must be frequency-divided by the number of times that the analog signal is read repeatedly. For example, if an analog signal having a black level is read repeatedly M times, then the pulse train must be frequency-divided by M.

Thereafter, the pixel charge transfer signal is supplied to the first switching element SW1 of the pixel 10 in order to transfer the photoelectron stored in the photodetector 12 to the FD 14. When the counter circuit 70 enters the second A/D conversion period, during which the signal level is converted into a digital signal, a signal level is read from the pixel 10 through the pixel amplifier 18 and the vertical signal line 20, and the signal level is input to the negative input terminal of the comparator 62. In order to read a signal level repeatedly two times, i.e., in order to read a pulse train that depends on an analog signal having a signal level repeatedly two times, the reference voltage Vref has two waveform ramps during the second A/D conversion period.

After having counted the pulses of the pulse train depending on the analog signal having a black level, the counter circuit 70 converts the count value into a 1's complement, and then into a 2's complement, as described above, before the counter circuit 70 counts the pulses of a pulse train depending on the analog signal having a signal level (the second pulse train). Consequently, the same result is produced as if the number of pulses of the pulse train depending on the analog signal having a black level were reduced (changed to a negative number). It is assumed that during the second A/D conversion period, in which the signal level is converted into a digital signal, the high-level switch signal is input to the frequency divider 68.

After having converted the count value into a 2's complement, the counter circuit 70 counts the pulses of a pulse train output from the AND gate 64 in synchronism with the first waveform ramp of the reference voltage Vref (at t4 in FIG. 15), until the reference voltage Vref becomes lower than the voltage of the analog signal having a signal level (until t5 in FIG. 15). Thereafter, the counter circuit 70 counts the pulses of the pulse train output from the AND gate 64 in synchronism with the second waveform ramp of the reference voltage Vref (at t6 in FIG. 15), until the reference voltage Vref becomes lower than the voltage of the analog signal having a signal level (until t7 in FIG. 15).

Consequently, the counter circuit 70 counts the pulses of the pulse train depending on the analog signal having a signal level, which is read repeatedly two times during the second A/D conversion period. Since the flip-flop 76 of the frequency divider 68 frequency-divides the pulse train input thereto by 2, and outputs the frequency-divided pulse train to the counter circuit 70, the counter circuit 70 eventually counts the pulses of the pulse train depending on one analog signal having a signal level, even though the counter circuit 70 reads the analog signal having a signal level repeatedly two times. Since the count value produced by the counter circuit 70 represents an average of the analog signal having a signal level, which is read repeatedly two times, the counter circuit 70 can count the pulses of the pulse train depending on the analog signal having a signal level more accurately. The greater the number of times that the pixel signal is read repeatedly, the higher the accuracy with which the pulses of the pulse train can be read. However, the pulse train must be frequency-divided by the same number of times that the pixel signal is read repeatedly. For example, if an analog signal having a signal level is read repeatedly N times, then the pulse train must be frequency-divided by N.

Figure 16:
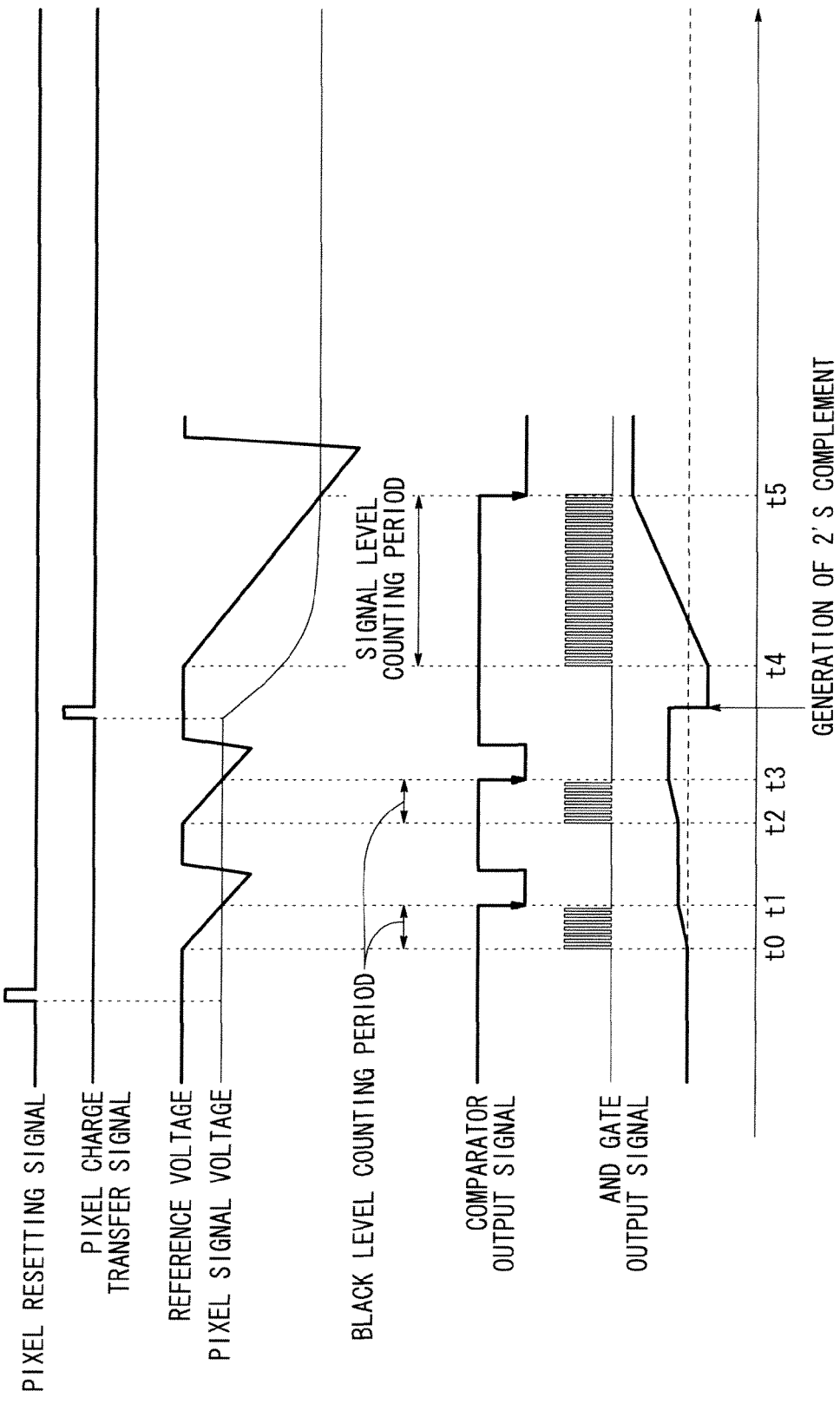
FIG. 16 is a timing chart of another operation sequence of the solid-state image sensing device.

FIG. 16 is a timing chart of another operation sequence of the solid-state image sensing device 50. In FIG. 16, it is assumed that a high-level switch signal is input to the frequency divider 68 during the first A/D conversion period, and a low-level switch signal is input to the frequency divider 68 during the second A/D conversion period.

Similar to the timing chart shown in FIG. 15, an analog signal having a black level is read repeatedly two times during the first A/D conversion period, and the counter circuit 70 counts the pulses of a pulse train depending on the analog signal having a black level. During the first A/D conversion period, since the high-level switch signal is input to the frequency divider 68, the flip-flop 76 frequency-divides the pulse train input thereto by 2, and outputs the frequency-divided pulse train to the counter circuit 70. Thus, the counter circuit 70 eventually counts the pulses of the pulse train depending on one analog signal having a black level, so that an accurate analog signal having a black level can be obtained, thereby increasing the accuracy of the A/D conversion process.

An analog signal having a signal level is read one time during the second A/D conversion period, and the counter circuit 70 counts the pulses of a pulse train depending on the analog signal having a black level. More specifically, in order to read an analog signal having a signal level one time, i.e., in order to read a pulse train depending on the analog signal having a black level one time, the reference voltage Vref has a single waveform ramp during the second A/D conversion period. In synchronism with the waveform ramp of the reference voltage Vref (at time t4 in FIG. 16), the counter circuit 70 counts the pulses of the pulse train output from the AND gate 64, until the reference voltage Vref becomes lower than the voltage of the analog signal having a signal level (until t5 in FIG. 16), thereby converting the analog signal having a signal level into a digital signal.

During the second A/D conversion period, since the low-level switch signal is input to the frequency divider 68, the pulse train input to the frequency divider 68 is not frequency-divided, but rather is input as is to the counter circuit 70, which counts the pulses of the pulse train depending on the analog signal having a signal level. In this case, the count value depending on the analog signal having a signal level is not as accurate as a count value produced when the analog signal having a signal level is read a plurality of times. However, since the number of pulses of the pulse train counted depending on an analog signal having a black level is accurate, it is possible to produce a more accurate digital signal, which is representative of a signal component of the pixel itself, than would be possible if the analog signal having a black level were not read a plurality of times. Furthermore, since it is time-consuming to read an analog signal having a signal level, if the analog signal having a signal level is read the same number of times that the analog signal having a black level is read, then the A/D conversion process also becomes time-consuming, resulting in a lower frame rate. In the present invention, however, the frame rate is prevented from being lowered by reading the analog signal having a signal level fewer times than the analog signal having a black level.

The solid-state image sensing device 50 may include a switching means for selecting whether an analog signal having a black level is read once or twice. The switching means may make such a selection based on an instruction from the user of the solid-state image sensing device 50. For example, the solid-state image sensing device 50 may have a speed priority mode and an accuracy priority mode. If the user selects the speed priority mode, then when an analog signal having a black level is read, the switching means inputs a high switch signal to the frequency divider 68 for selecting a frequency dividing ratio of ½, and the analog signal having a black level is read twice. When an analog signal having a signal level is read, the switching means inputs a low switch signal to the frequency divider 68 for selecting a frequency dividing ratio of 1, and the analog signal having a signal level is read once. In this case, a voltage having a ramp waveform for reading the analog signal having a black level twice, and a voltage having a ramp waveform for reading the analog signal having a signal level once are input as reference voltages to the comparator 62. If the user selects the accuracy priority mode, then the switching means inputs a high switch signal to the frequency divider 68 for selecting a frequency dividing ratio of ½, and the analog signal having a black level as well as the analog signal having a signal level are read twice. In this case, a voltage having a ramp waveform for reading the analog signal having a black level twice, and a voltage having a ramp waveform for reading the analog signal having a signal level twice are input as reference voltages to the comparator 62.

Alternatively, the switching means may automatically change the number of times that an analog signal is read based on an external signal read from outside of the solid-state image sensing device 50. For example, if a vehicle speed value, which is sent from a vehicle speed sensor (not shown), is higher than a threshold value, then the switching means switches to the speed priority mode, in which a switch signal is input to the frequency divider 68 in order to frequency-divide by 2 a pulse train depending on an analog signal having a black level, and to prevent the pulse train depending on an analog signal having a signal level from being frequency-divided. In contrast, if the vehicle speed value is lower than the threshold value, then the switching means switches to the accuracy priority mode, in which a switch signal is input to the frequency divider 68 in order to frequency-divide by 2 the pulse train depending on an analog signal having a black level as well as the pulse train depending on an analog signal having a signal level.

Further, alternatively, an image processor for processing image data captured by the solid-state image sensing device 50 calculates a motion of a subject, which is included in the image data (i.e., a motion vector of the subject) based on the captured image data, whereby the switching means can acquire a calculated motion of the subject. If the motion of the subject is greater than a certain threshold value, then the switching means may automatically switch to the speed priority mode, and if the motion of the subject is smaller than the threshold value, the switching means may automatically switch to the accuracy priority mode.

According to Japanese Laid-Open Patent Publication No. 2009-296423, which has been referred to above as related art, it is not possible to arbitrarily change the number of times that an analog signal having a black level is read and the number of times that an analog signal having a signal level is read. According to the present embodiment, since it is possible to arbitrarily change the number of times that an analog signal having a black level is read and the number of times that an analog signal having a signal level is read, signals can be processed depending on the situation by which image data are captured by the solid-state image sensing device 50.

Further, alternatively, an initial value, which indicates whether an analog signal having a black level is read once or twice, may be provided, so that it is not possible to select whether the analog signal having a black level is read once or twice. According to such a modification, a switching means is not required, and a predetermined switching signal is input to the frequency divider 68 in order to read an analog signal having a black level, and a predetermined switching signal is input to the frequency divider 68 in order to read an analog signal having a signal level. A predetermined reference voltage is input to the comparator 62.

In the above embodiment, signals are read either once or twice. However, an analog signal having a black level may be read repeatedly M times (M=1, 2, 3, ..., m). In this case, since the frequency divider 68 needs to frequency-divide by M a pulse train depending on the analog signal having a black level, the frequency divider 68 should have as many flip-flops 76 as a number that depends on M. For example, if an analog signal having a black level is to be read repeatedly eight times, then the frequency divider 68 should have three flip-flops 76 connected in cascade.

According to another modification, an analog signal having a signal level may be read repeatedly N times (N=1, 2, 3, ..., n) where N≦M. In this case, the frequency divider 68 may be arranged to frequency-divide by N an analog signal having a signal level. For example, if the analog signal having a signal level is read repeatedly four times, the frequency divider 68 may include two flip-flops 76 connected in cascade, or may include a 3-bit shift register, for example, in order to frequency-divide the analog signal having a signal level by 3.

If an analog signal having a black level and an analog signal having a signal level are read an arbitrary number of times, respectively, e.g., if an analog signal having a black level is read M times and an analog signal having a signal level is read N times, then the frequency divider 68 may include a divide-by-M frequency divider and a divide-by-N frequency divider. Each of the divide-by-M frequency divider and the divide-by-N frequency divider may comprise a K-bit shift register, and a switch for varying the frequency dividing ratio thereof. In this case, the solid-state image sensing device 50 may include a switching means for switching between the number of times that the analog signal having a black level is read and the number of times that the analog signal having a signal level is read.

Figure 17:
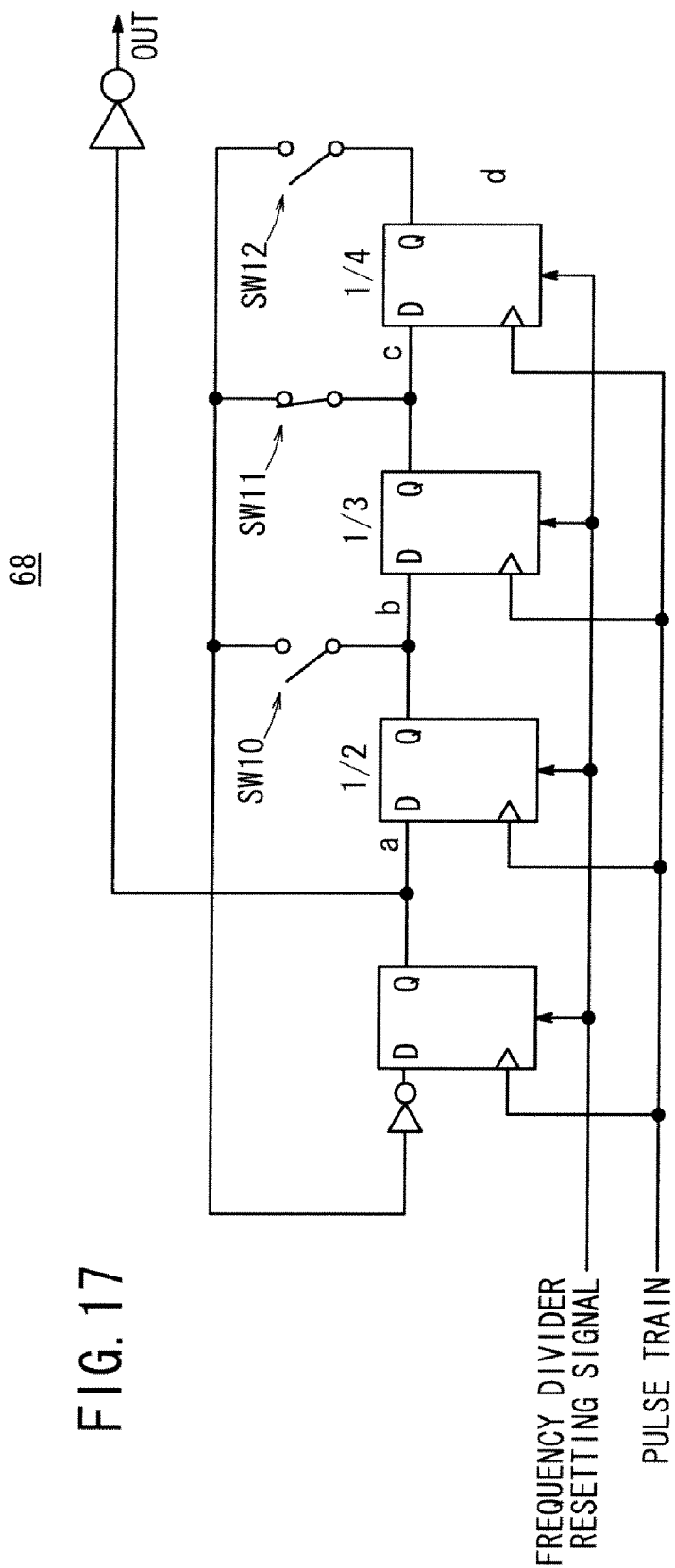
FIG. 17 is a block diagram of a frequency divider, in a case where an analog signal having a black level and an analog signal having a signal level are each read an arbitrary number of times.

FIG. 17 is a block diagram of a frequency divider 68, in a case where an analog signal having a black level and an analog signal having a signal level each are read an arbitrary number of times. As shown in FIG. 17, the frequency divider 68 includes as many dual-edge-triggered flip-flops as the number of K bits, whereby an arbitrary frequency dividing ratio can be changed by turning on any one of a plurality of switches SW10, SW11, SW12 utilized for switching between respective frequency dividing ratios. In this case, N, M and K satisfy the relationship N and M≦K.

Figure 18:
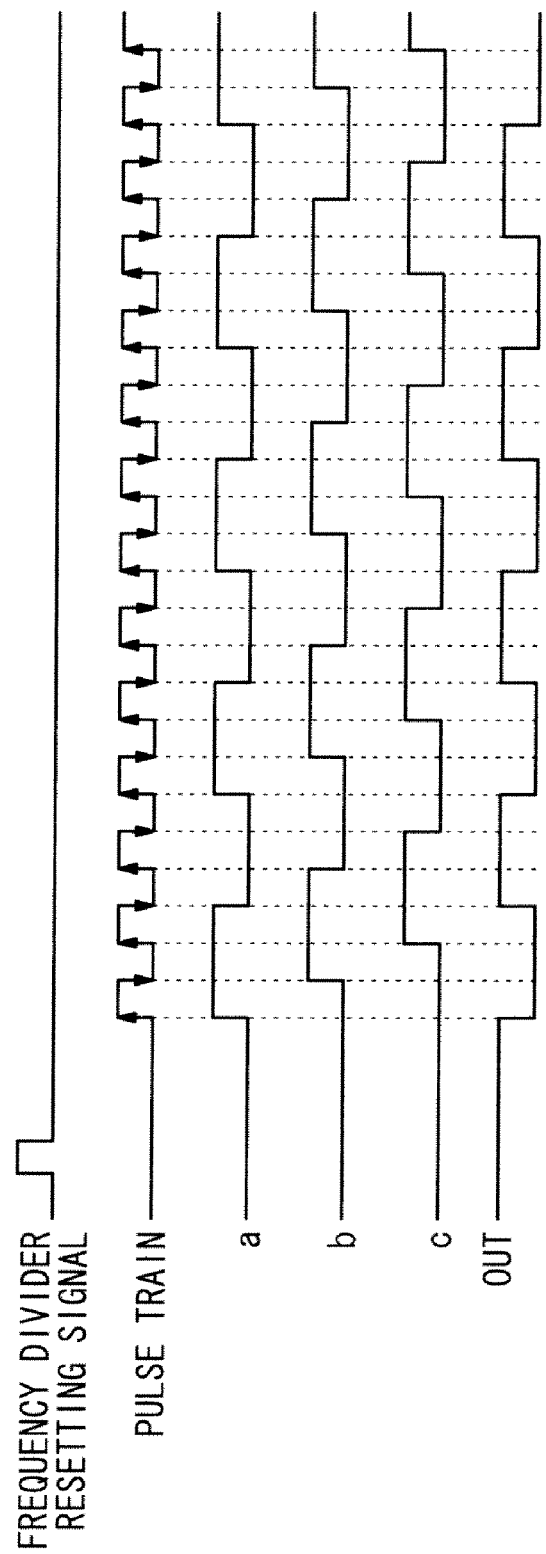
FIG. 18 is a diagram showing a signal OUT that is output from the frequency divider shown in FIG. 17.

FIG. 18 is a diagram showing a signal OUT, which is output from the frequency divider 68 shown in FIG. 17. The signal OUT shown in FIG. 18 is output from the frequency divider 68 when the switches SW10, SW12 are turned off and the switch SW11 is turned on. In FIG. 18, "a" represents a signal output from a first D flip-flop, "b" represents a signal output from a second D flip-flop, and "c" represents a signal output from a third D flip-flop. As shown in FIG. 18, the frequency divider 68 frequency-divides a pulse train input thereto by 3.

According to Japanese Laid-Open Patent Publication No. 2009-296423, the frame rate is lowered because an analog signal having a black level and an analog signal having a signal level are read respectively the same number of times. In contrast, according to the present embodiment, the counter device 66 includes the frequency divider 68, which is capable of switching between frequency dividing ratios. Therefore, the number of times that an analog signal having a black level, which is to be converted into a digital signal during the first A/D conversion period, is read, and the number of times that an analog signal having a signal level, which is to be converted into a digital signal during the second A/D conversion period, is read may be set differently from each other. As a result, the number of times that a pulse train depending on an analog signal having a signal level is read may be made smaller than the number of times that a pulse train depending on an analog signal having a black level is read, thereby preventing the frame rate from becoming lowered, as well as reducing noise caused by the A/D conversion process. In other words, it is possible to reduce the time required to perform the A/D conversion process. Further, a digital value can be obtained, which more accurately represents the signal component of the pixel itself.

Furthermore, inasmuch as the count value produced by the flip-flops 80 is converted respectively into a 1's complement and a 2's complement, the counter circuit 70, which merely counts up a pulse train, may be used to perform a subtraction process.

The above embodiment may be modified as follows:

(1) In the above embodiment, the flip-flop 76 is provided as a frequency divider. However, the frequency divider is not limited to being made up from the flip-flop 76.

(2) In the above embodiment, the counter circuit 70 functions as an up/down counter, although the counter circuit is used only for counting up a pulse train. However, the counter circuit 70 may be a conventional counter circuit used both for counting up and counting down a pulse train.

(3) In the above embodiment, the counter circuit 70 converts a signal component of the pixel itself, which is generated by subtracting an analog signal having a black level from an analog signal having a signal level, into a digital value. However, the counter circuit 70 may be arranged to output a digital value of a black level when the counter circuit 70 converts the black level into the digital value, or to output a digital value of a signal level when the counter circuit 70 converts the signal level into the digital value. In other words, the counter circuit 70 may be a counter circuit, which does not subtract an analog signal having a black level from an analog signal having a signal level. In this case, a processing circuit for processing digital values may be provided to subtract a digital value having a black level from a digital value of a signal level output from the counter circuit 70, for thereby determining a digital value that is representative of the signal component of the pixel itself. In other words, the solid-state image sensing device 50 may include A/D converters apart from the integrating A/D converters 54.

Figure 19:
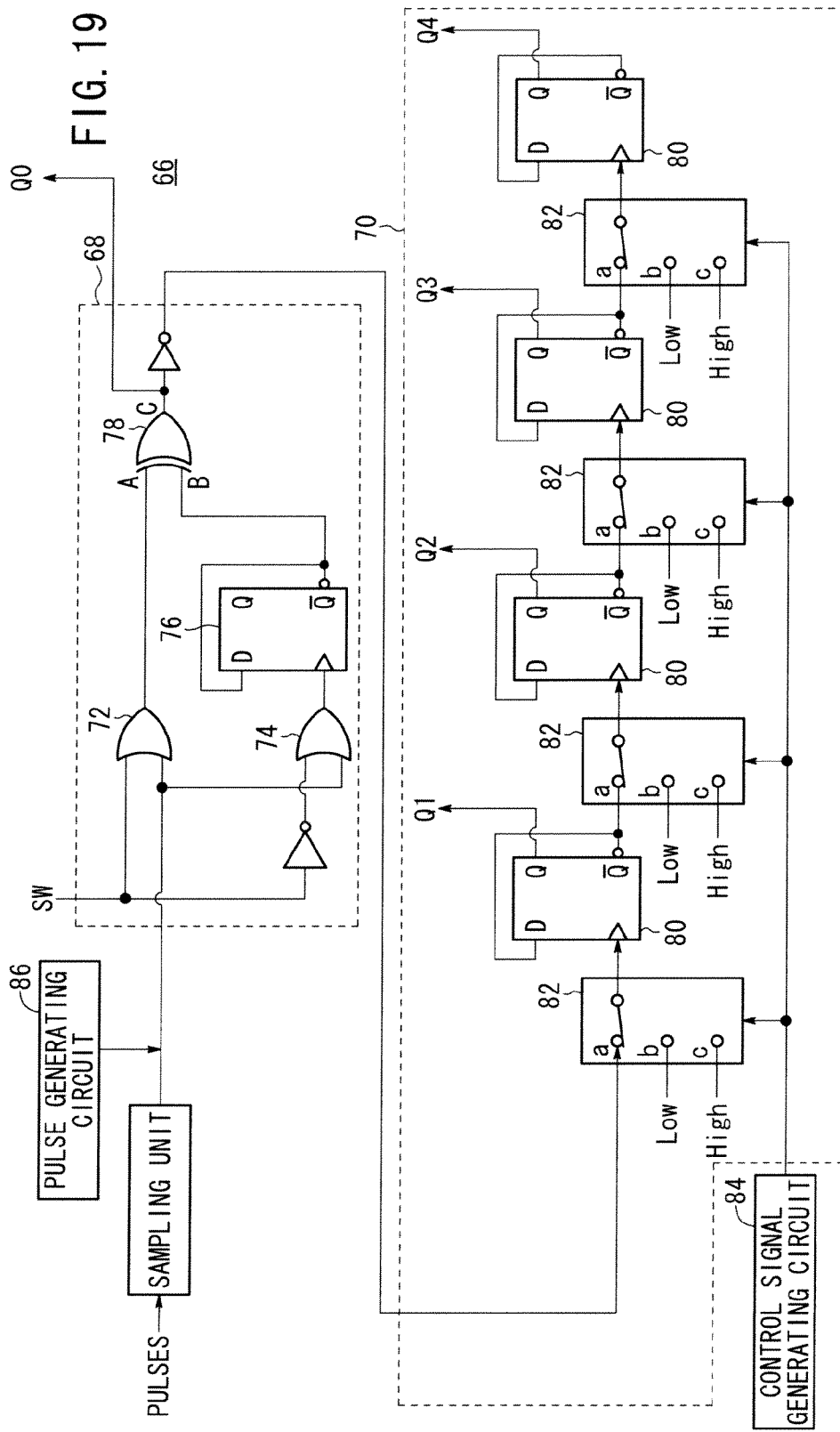
FIG. 19 is a block diagram of another circuit arrangement of the counter device shown in FIG. 7.

(4) The counter device 66 may be arranged as shown in FIG. 19. The counter device 66, which is arranged as shown in FIG. 19, allows the counter circuit 70 to count up the pulse train in response to positive-going and negative-going edges thereof, so that the pulse train may have a frequency that is reduced by one-half.

Figure 20:
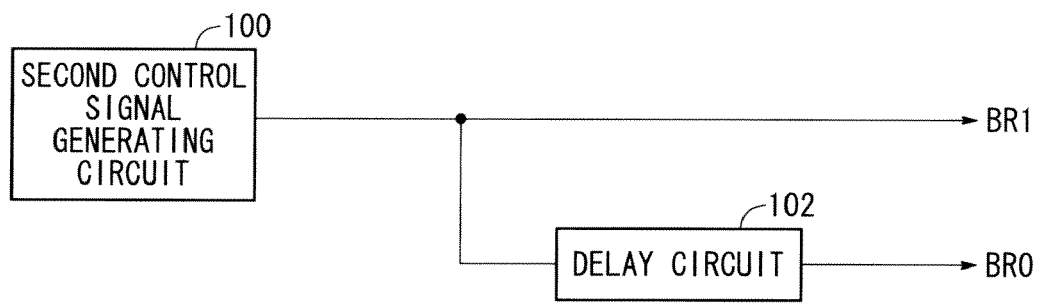
FIG. 20 is a block diagram of a control signal generating circuit shown in FIG. 8.

(5) The control signal generating circuit 84 may function to generate the first control signal BR0 from the second control signal BR1. FIG. 20 is a block diagram of the control signal generating circuit 84. As shown in FIG. 20, the control signal generating circuit 84 comprises a second control signal generating circuit 100 and a delay circuit 102. The second control signal generating circuit 100 generates the second control signal BR1. The second control signal BR1, which is generated by the second control signal generating circuit 100, is input to the delay circuit 102. The delay circuit 102 delays the second control signal BR1 input thereto by a prescribed time. The delayed second control signal BR1 serves as the first control signal BR0. The control signal generating circuit 84 outputs the second control signal BR1, which is generated by the second control signal generating circuit 100, and the first control signal BR0, which is output from the delay circuit 102. Therefore, the control signal generating circuit 84 does not need to generate two control signals using a sequencer, and the sequencer circuitry may be reduced in size.

Figure 21:
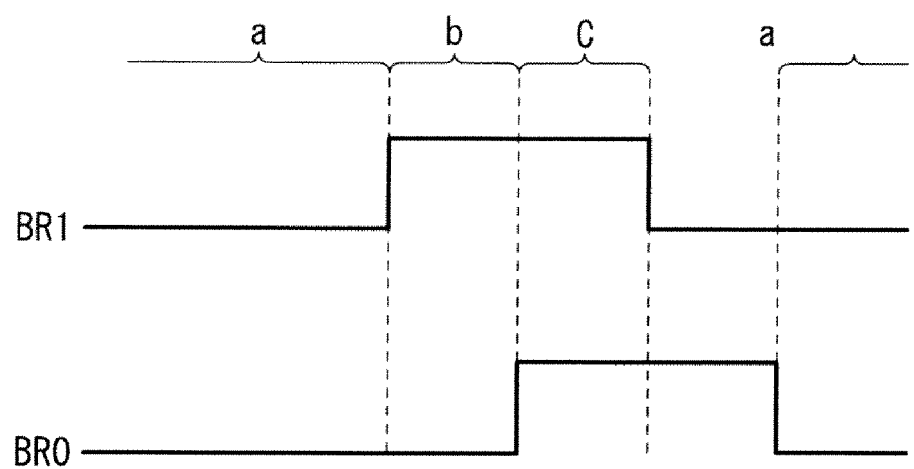
FIG. 21 is a diagram showing waveforms of a first control signal BR0 and a second control signal BR1, which are output from the control signal generating circuit shown in FIG. 20.

FIG. 21 is a diagram showing waveforms of the first control signal BR0 and the second control signal BR1, which are output from the control signal generating circuit 84 shown in FIG. 20. As shown in FIG. 21, the waveform of the first control signal BR0 is delayed a prescribed time from the waveform of the second control signal BR1. As described above, when the first control signal BR0 and the second control signal BR1 are both low in level, the first and second control signals BR0, BR1 are in the state "a". When the first control signal BR0 is in a low state and the second control signal BR1 is in a high state, the first and second control signals BR0, BR1 are in the state "b". When the first control signal BR0 and the second control signal BR1 are both high in level, the first and second control signals BR0, BR1 are in the state "c".

(6) The above modifications (1) through (5) may be combined in any of various arbitrary ways.

The solid-state image sensing device 50 functions as a solid-state image sensing device that performs the signal processing method according to the present invention when controlled by a computer, not shown.

Although certain preferred embodiments of the present invention have been shown and described in detail, it should be understood that various changes and modifications may be made to the embodiments without departing from the scope of the invention as set forth in the appended claims.

What is claimed is:

1. A signal processing method for a solid-state image sensing device including:
   a pixel for photoelectrically generating a photoelectron by light and storing the photoelectron; and
   an A/D converter for converting an analog signal, which is read from the pixel based on the stored photoelectron, into a digital signal;
   the A/D converter including a frequency divider which receives a pulse train depending on the analog signal read from the pixel and which is able to change a frequency dividing ratio into an arbitrary dividing ratio, and a counter circuit for counting the frequency-divided pulses;
   the signal processing method comprising:
   a first reading step of reading repeatedly M times, with the A/D converter, a first pulse train depending on an analog signal having a black level from the pixel, during a first A/D conversion period in which the analog signal having a black level is converted into a digital signal;
   a first frequency-dividing step of frequency-dividing by M, with the frequency divider, frequency-dividing pulses of the first pulse train which is read repeatedly M times;
   a first counting step of counting, with the counter circuit, pulses of the first pulse train, which is read repeatedly M times and frequency-divided by M;
   a second reading step of reading repeatedly N times, with the A/D converter, a second pulse train depending on an analog signal having a signal level from the pixel, during a second A/D conversion period in which the analog signal having the signal level is converted into a digital signal;

a second frequency-dividing step of frequency-dividing by N, with the frequency divider, frequency-dividing pulses of the second pulse train which is read repeatedly N times; and a second counting step of counting, with the counter circuit, pulses of the second pulse train, which is read repeatedly N times and frequency-divided by N, wherein M and N satisfy the relationship $N \leq M$.

2. The signal processing method according to claim 1, wherein the counter circuit includes:

a plurality of flip-flops for counting up pulses of the pulse trains, the flip-flops being connected in cascade;

a plurality of switch circuits connected as previous stages of the flip-flops, respectively, each for selecting a propagated signal from the previous flip-flops, or a low-level signal, or a high-level signal input thereto, and outputting the selected signal to each clock terminal of the following flip-flops, via the switch circuits, each of the switch circuits being constructed as a 2-to-1 selector;

a control signal generating circuit for generating a switch circuit control signal to control each of the switch circuits to select the propagated signal, or the low-level signal, or the high-level signal; and a pulse generating circuit for generating one pulse to convert a count value, which is a 1's complement, from the flip-flops into a 2's complement, wherein the switch circuits include a first switch circuit, which is supplied with the pulse trains frequency-divided by the frequency divider as the propagated signal, and other switch circuits, which are supplied with inverted output signals from the previous flip-flops as the propagated signals;

the signal processing method further comprising:

a first complement converting step of controlling the switch circuits to invert the binary output signals thereof, with the control signal generating circuit, once during a period in which the first A/D conversion period switches to the second A/D conversion period, thereby outputting the low-level signal and the high-level signal, and converting the count value into the 1's complement;

a second complement converting step of inputting the one pulse to the first switch circuit, with the pulse generating circuit, after the first A/D conversion period and before the second A/D conversion period, thereby converting the count value into the 2's complement, wherein the first counting step comprises a step of controlling, with the control signal generating circuit, the switch circuits to output the propagated signal, for thereby the flip-flops counting up the pulses of the first pulse train, which is frequency-divided by M in the first frequency-dividing step, and the second counting step comprises a step of controlling, with the control signal generating circuit, the switch circuits to output the propagated signal after the first A/D conversion period switches to the second A/D conversion period, for thereby the flip-flops counting up the pulses of the second pulse train, which is frequency-divided by N in the second frequency-dividing step.

3. The signal processing method according to claim 2, wherein the flip-flops include a flip-flop of the most significant bit whose output signal functions as a sign bit.

4. The signal processing method according to claim 2, wherein each of the switch circuits includes a first transfer gate and a second transfer gate;

the switch circuit control signal includes a first control signal, which is input to the first transfer gate, for converting the count value into the 1's complement, and a second control signal for turning on and off the first transfer gate or the second transfer gate; and the propagated signal is input to the second transfer gate.

5. The signal processing method according to claim 1, wherein the pixel includes a resetting section for discharging the photoelectron stored by the pixel in order to reset the pixel; and the analog signal having a black level comprises an analog signal from the pixel that is reset by the resetting section, and the analog signal having a signal level comprises an analog signal photoelectrically converted from light by the pixel.

6. A solid-state image sensing device comprising:

a pixel for photoelectrically generating a photoelectron by light and storing the photoelectron; and an A/D converter for reading from the pixel repeatedly M times a first pulse train depending on an analog signal having a black level, during a first A/D conversion period, for reading from the pixel repeatedly N times a second pulse train depending on an analog signal having a signal level, during a second A/D conversion period after the first A/D conversion period, and for counting pulses of the pulse trains thereby to convert the analog signals into a digital signal;

the A/D converter including a frequency divider which receives a pulse train depending on the analog signals read from the pixel and which is able to change a frequency dividing ratio into an arbitrary dividing ratio, and a counter circuit for counting the frequency-divided pulses, wherein the frequency divider frequency-divides by M the first pulse train which is read repeatedly M times, and frequency-divides by N the second pulse train which is read repeatedly N times, the counter circuit counts pulses of the first pulse train, which is read repeatedly M times and frequency-divided by M, and counts pulses of the second pulse train, which is read repeatedly N times and frequency-divided by N; and M and N satisfy the relationship $N \leq M$.

7. The solid-state image sensing device according to claim 6, wherein the counter circuit comprises:

a plurality of flip-flops for counting up pulses of the pulse trains, the flip-flops being connected in cascade;

a plurality of switch circuits connected as previous stages of the flip-flops, respectively, each for selecting a propagated signal from the previous flip-flops, or a low-level signal, or a high-level signal input thereto, and outputting the selected signal to each clock terminal of the following flip-flops, via the switch circuits, each of the switch circuits being constructed as a 2-to-1 selector;

a control signal generating circuit for generating a switch circuit control signal to control each of the switch circuits to select the propagated signal, or the low-level signal, or the high-level signal; and a pulse generating circuit for generating one pulse to convert a count value, which is a 1's complement, from the flip-flops into a 2's complement when the first A/D conversion period switches to the second A/D conversion period;

wherein the switch circuits include a first switch circuit which is supplied with the pulse trains frequency-divided by the frequency divider as the propagated signal, and other switch circuits which are supplied with inverted output signals from the previous flip-flops as the propagated signals;

wherein the control signal generating circuit:

controls the switch circuits to output the propagated signal, for the flip-flops counting up the pulses of the first pulse train, which is read repeatedly M times and frequency-divided by M by the frequency divider;

controls the switch circuits to output the propagated signal during the second A/D conversion period for the flip-flops counting up the pulses of the second pulse train, which is read repeatedly N times and frequency-divided by N by the frequency divider; and controls the switch circuits to invert the binary output signals thereof once during a period in which the first A/D conversion period switches to the second A/D conversion period, thereby outputting the low-level signal and the high-level signal, and converting the count value into the 1's complement; and wherein the pulse generating circuit inputs the one pulse to the first switch circuit after the first A/D conversion period and before the second A/D conversion period, thereby converting the count value into the 2's complement.

8. The solid-state image sensing device according to claim 7, wherein the flip-flops include a flip-flop of the most significant bit whose output signal functions as a sign bit.

9. The solid-state image sensing device according to claim 6, wherein the pixel includes a resetting section for discharging the photoelectron stored by the pixel in order to reset the pixel; and the analog signal having a black level comprises an analog signal from the pixel that is reset by the resetting section, and the analog signal having a signal level comprises an analog signal photoelectrically converted from light by the pixel.

* * * * *